United States Patent
Mikuriya et al.

(10) Patent No.: US 6,728,633 B2
(45) Date of Patent: Apr. 27, 2004

(54) MAP DATA PROCESSING APPARATUS AND METHOD OF THE SAME

(75) Inventors: Makoto Mikuriya, Tokyo (JP); Mitsuo Shimotani, Tokyo (JP); Masaharu Umezu, Tokyo (JP); Tomoya Ikeuchi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 5 days.

(21) Appl. No.: 10/024,216

(22) Filed: Dec. 21, 2001

(65) Prior Publication Data

US 2002/0091485 A1 Jul. 11, 2002

(30) Foreign Application Priority Data

Jan. 10, 2001 (JP) ........................................ 2001-002959

(51) Int. Cl.$^7$ .............................................. G01C 21/30
(52) U.S. Cl. .................... 701/208; 701/210; 701/25; 701/26; 707/203; 707/204
(58) Field of Search ................. 701/208, 209, 701/210, 211, 207, 23–26, 212; 713/200, 168; 455/456, 414, 457; 340/988, 990, 995; 707/201, 104.1, 8, 9, 1 G, 200, 203, 205, 10, 100, 204; 717/168–170

(56) References Cited

U.S. PATENT DOCUMENTS 5,684,989 A * 11/1997 Nissato ........................ 707/201
6,075,467 A * 6/2000 Ninagawa .................... 340/995
6,230,098 B1 * 5/2001 Ando et al. .................. 701/208
6,246,958 B1 * 6/2001 Hirono ........................ 701/208
6,252,876 B1 * 6/2001 Brueckheimer et al. ..... 370/394
6,330,453 B1 * 12/2001 Suzuki et al. ................ 455/456
6,546,334 B1 * 4/2003 Fukuchi et al. ............. 701/208
2002/0028681 A1 * 3/2002 Lee et al. .................... 455/456
2002/0032787 A1 * 3/2002 Overton et al. ............. 709/230
2002/0174360 A1 * 11/2002 Ikeda ........................ 713/200

FOREIGN PATENT DOCUMENTS

| JP | 11065436 A | * | 3/1999 | ........... G09B/29/10 |
| JP | 11-95657 |   | 4/1999 |   |
| JP | 2000298429 A | * | 10/2000 | ........... G09B/29/00 |
| JP | 2000310543 A | * | 11/2000 | ........... G01C/21/00 |
| JP | 2001012957 A | * | 1/2001 | ........... G01C/21/00 |
| JP | 2001216321 A | * | 8/2001 | ........... G06F/17/30 |

OTHER PUBLICATIONS

Kim et al., "A Geographic Differential Script File Method For Distributed Geographic Information Systems", IEICE Trans. Inf. & Syst., vol. E082–D, No. 1, Jan. 1999, pp. 113–119.

* cited by examiner

Primary Examiner—Jacques H. Louis-Jacques
(74) Attorney, Agent, or Firm—Leydig, Voit & Mayer, Ltd.

(57) ABSTRACT

A map data processing apparatus and a method of obtaining updating operation information indicating updating content of map data, and updating the map data according to the updating operation information obtained.

10 Claims, 36 Drawing Sheets

FIG.5A
ROUTE CALCULATION DATA

| ROUTE CALCULATION HEADER |
|---|
| NODE TABLE |
| CONNECTION INFORMATION |
| COST TABLE |

FIG.5B
ROUTE CALCULATION HEADER

| offset | |
|---|---|
| 0 | OFFSET OF NODE TABLE |
| 4 | DATA SIZE OF NODE TABLE |
| 8 | OFFSET OF CONNECTION INFORMATION |
| 12 | DATA SIZE OF CONNECTION INFORMATION |
| 16 | OFFSET OF COST TABLE |
| 20 | DATA SIZE OF COST TABLE |

FIG.5C
NODE TABLE

| | |
|---|---|
| 0 | NODE RECORD |
| 1 | NODE RECORD |
| 2 | NODE RECORD |
| ⋮ | ⋮ |
| n-1 | NODE RECORD |
| n | NODE RECORD |

NODE RECORD NUMBER

FIG.5D
CONNECTION INFORMATION

| | |
|---|---|
| 0 | CONNECTED RECORD |
| 1 | CONNECTED RECORD |
| 2 | CONNECTED RECORD |
| ⋮ | ⋮ |
| n-1 | CONNECTED RECORD |
| n | CONNECTED RECORD |

CONNECTED RECORD NUMBER

FIG.5E
COST TABLE

| | |
|---|---|
| 0 | COST RECORD |
| 1 | COST RECORD |
| 2 | COST RECORD |
| ⋮ | ⋮ |
| m-1 | COST RECORD |
| m | COST RECORD |

COST RECORD NUMBER

FIG.5F
NODE RECORD

| NODE COORDINATE |
|---|
| NODE ATTRIBUTE |
| NUMBER OF CONNECTED LINKS |
| NUMBER OF REGULATED RECORDS |
| OFFSET OF CONNECTED RECORD |

FIG.5G
CONNECTED RECORD

| | |
|---|---|
| 0 | LINKED RECORD |
| 1 | LINKED RECORD |
| 2 | LINKED RECORD |
| ⋮ | ⋮ |
| p-1 | LINKED RECORD |
| p | LINKED RECORD |
| 0 | REGULATED RECORD |
| 1 | REGULATED RECORD |
| 2 | REGULATED RECORD |
| ⋮ | ⋮ |
| q-1 | REGULATED RECORD |
| q | REGULATED RECORD |

LINKED RECORD NUMBER
REGULATED RECORD NUMBER

FIG.5H
LINKED RECORD

| ADJACENT NODE INFORMATION |
|---|
| LINKED COST INFORMATION |

FIG.5I
REGULATED RECORD

| ENTRY LINK INFORMATION |
|---|
| EXIT LINK INFORMATION |
| INTER-LINK REGULATED CODE |

FIG.5J
COST RECORD

| LINK ATTRIBUTE |
|---|
| LINK LENGTH |
| AVERAGE TRAVELING TIME |
| WIDTH INFORMATION |

FIG.6

NODE TABLE

| NODE RECORD NUMBER | NODE COORDINATE | NODE ATTRIBUTE | NUMBER OF CONNECTED LINKS | NUMBER OF REGULATED RECORDS | OFFSET OF CONNECTED RECORD |
|---|---|---|---|---|---|
| 0 | (X0,Y0) | NA0 | 1 | 0 | JOFS0 |
| 1 | (X1,Y1) | NA1 | 4 | 4 | JOFS1 |
| 2 | (X2,Y2) | NA2 | 4 | 4 | JOFS2 |
| 3 | (X3,Y3) | NA3 | 3 | 2 | JOFS3 |
| 4 | (X4,Y4) | NA4 | 1 | 0 | JOFS4 |
| 5 | (X5,Y5) | NA5 | 1 | 0 | JOFS5 |
| 6 | (X6,Y6) | NA6 | 1 | 0 | JOFS6 |
| 7 | (X7,Y7) | NA7 | 1 | 0 | JOFS7 |
| 8 | (X8,Y8) | NA8 | 1 | 0 | JOFS8 |
| 9 | (X9,Y9) | NA9 | 1 | 0 | JOFS9 |
| 10 | (X10,Y10) | NA10 | 1 | 0 | JOFS10 |
| 11 | (X11,Y11) | NA11 | 1 | 0 | JOFS11 |
| 12 | (X12,Y12) | NA12 | 4 | 4 | JOFS12 |
| 13 | (X13,Y13) | NA13 | 4 | 4 | JOFS13 |
| 14 | (X14,Y14) | NA14 | 3 | 2 | JOFS14 |
| 15 | (X15,Y15) | NA15 | 1 | 0 | JOFS15 |

FIG.7

CONNECTION INFORMATION

| JN | JFOS | LINKED RECORD | | | | REGULATED RECORD | | | |
|---|---|---|---|---|---|---|---|---|---|
| | | LN=0 | LN=1 | LN=2 | LN=3 | RN=0 | RN=1 | RN=2 | RN=3 |
| 0 | JOFS0 | NN=1 CN=0 | | | | | | | |
| 1 | JOFS1 | NN=0 CN=0 | NN=12 CN=11 | NN=2 CN=1 | NN=5 CN=8 | IN=0 ON=3 RC=r10 | IN=1 ON=0 RC=r11 | IN=2 ON=1 RC=r12 | IN=3 ON=2 RC=r13 |
| 2 | JOFS2 | NN=1 CN=1 | NN=13 CN=12 | NN=3 CN=2 | NN=6 CN=9 | IN=0 ON=3 RC=r20 | IN=1 ON=0 RC=r21 | IN=2 ON=1 RC=r22 | IN=3 ON=2 RC=r23 |
| 3 | JOFS3 | NN=2 CN=2 | NN=4 CN=3 | NN=7 CN=10 | | IN=0 ON=2 RC=r30 | IN=2 ON=1 RC=r31 | | |
| 4 | JOFS4 | NN=3 CN=3 | | | | | | | |
| 5 | JOFS5 | NN=1 CN=8 | | | | | | | |
| 6 | JOFS6 | NN=2 CN=9 | | | | | | | |
| 7 | JOFS7 | NN=3 CN=10 | | | | | | | |
| 8 | JOFS8 | NN=12 CN=13 | | | | | | | |
| 9 | JOFS9 | NN=13 CN=14 | | | | | | | |
| 10 | JOFS10 | NN=14 CN=15 | | | | | | | |
| 11 | JOFS11 | NN=12 CN=4 | | | | | | | |
| 12 | JOFS12 | NN=11 CN=4 | NN=8 CN=13 | NN=13 CN=5 | NN=1 CN=11 | IN=0 ON=3 RC=r60 | IN=1 ON=0 RC=r61 | IN=2 ON=1 RC=r62 | IN=3 ON=2 RC=r63 |
| 13 | JOFS13 | NN=12 CN=5 | NN=9 CN=14 | NN=14 CN=6 | NN=2 CN=12 | IN=0 ON=3 RC=r70 | IN=1 ON=0 RC=r71 | IN=2 ON=1 RC=r72 | IN=3 ON=2 RC=r73 |
| 14 | JOFS14 | NN=13 CN=6 | NN=10 CN=15 | NN=15 CN=7 | | IN=1 ON=0 RC=r80 | IN=2 ON=1 RC=r81 | | |
| 15 | JOFS15 | NN=14 CN=7 | | | | | | | |

JN: CONNECTED RECORD NUMBER  JOFS: OFFSET OF CONNECTED RECORD
LN: LINKED RECORD NUMBER  RN: REGULATED RECORD NUMBER
NN: ADJACENT NODE INFORMATION  CN: LINKED COST INFORMATION
IN: ENTRY LINK INFORMATION  ON: EXIT LINK INFORMATION
RC: INTER-LINK REGULATED CODE
HATCHED PART INDICATE NON-PRESENCE OF TARGET LINKED RECORD, REGULATED RECORD

FIG.8

COST TABLE

| COST RECORD NUMBER | LINK LENGTH | AVERAGE TRAVELING TIME | WIDTH INFORMATION |
|---|---|---|---|
| 0 | LL0 | TT0 | W0 |
| 1 | LL1 | TT1 | W1 |
| 2 | LL2 | TT2 | W2 |
| 3 | LL3 | TT3 | W3 |
| 4 | LL4 | TT4 | W4 |
| 5 | LL5 | TT5 | W5 |
| 6 | LL6 | TT6 | W6 |
| 7 | LL7 | TT7 | W7 |
| 8 | LL8 | TT8 | W8 |
| 9 | LL9 | TT9 | W9 |
| 10 | LL10 | TT10 | W10 |
| 11 | LL11 | TT11 | W11 |
| 12 | LL12 | TT12 | W12 |
| 13 | LL13 | TT13 | W13 |
| 14 | LL14 | TT14 | W14 |
| 15 | LL15 | TT15 | W15 |

FIG.9

NODE TABLE

| NODE RECORD NUMBER | NODE COORDINATE | NODE ATTRIBUTE | NUMBER OF CONNECTED LINKS | NUMBER OF REGULATED RECORDS | OFFSET OF CONNECTED RECORD |
|---|---|---|---|---|---|
| 0 | (X0,Y0) | NA0 | 1 | 0 | JOFS0 |
| 1 | (X1,Y1) | NA1 | 4 | 4 | JOFS1 |
| 2 | (X2,Y2) | NA2 | 4→3 | 4→2 | JOFS2 |
| 3 | (X3,Y3) | NA3 | 3→4 | 2→4 | JOFS3→JOFS3' |
| 4 | (X4,Y4) | NA4 | 1 | 0 | JOFS4 |
| 5 | (X5,Y5) | NA5 | 1 | 0 | JOFS5 |
| 6 | (X6,Y6) | NA6 | 1 | 0 | JOFS6 |
| 7 | (X7,Y7) | NA7 | 1 | 0 | JOFS7 |
| 8 | (X8,Y8) | NA8 | 1 | 0 | JOFS8 |
| 9 | (X9,Y9) | NA9 | 1 | 0 | JOFS9 |
| 10 | (X10,Y10) | NA10 | 1 | 0 | JOFS10 |
| 11 | (X11,Y11) | NA11 | 1 | 0 | JOFS11 |
| 12 | (X12,Y12) | NA12 | 4 | 4 | JOFS12 |
| 13 | (X13,Y13) | NA13 | 4→3 | 4→2 | JOFS13 |
| 14 | (X14,Y14) | NA14 | 3→4 | 2 | JOFS14→JOFS14' |
| 15 | (X15,Y15) | NA15 | 1 | 0 | JOFS15→JOFS15' |

FIG. 10

CONNECTION INFORMATION

| JN | JFOS | LINKED RECORD LN=0 | LN=1 | LN=2 | LN=3 | REGULATED RECORD RN=0 | RN=1 | RN=2 | RN=3 |
|---|---|---|---|---|---|---|---|---|---|
| 0 | JOFS0 | NN=1 CN=0 | / | / | / | / | / | / | / |
| 1 | JOFS1 | NN=0 CN=0 | NN=12 CN=11 | NN=2 CN=1 | NN=5 CN=8 | IN=0 ON=3 RC=r10 | IN=1 ON=0 RC=r11 | IN=2 ON=1 RC=r12 | IN=3 ON=2 RC=r13 |
| 2 | JOFS2 | NN=1 CN=1 | NN=3 CN=2 | NN=6 CN=9 | / | IN=0 ON=3 RC=r20 | IN=3 ON=2 RC=r23 | / | / |
| 3 | JOFS3 ↓ JOFS3' | NN=2 CN=2 | NN=4 CN=3 | NN=7 CN=10 | NN=14 CN=15 | IN=0 ON=3 RC=r30 | IN=1 ON=0 RC=r32 | IN=2 ON=1 RC=r33 | IN=3 ON=2 RC=r31 |
| 4 | JOFS4 | NN=3 CN=3 | / | / | / | / | / | / | / |
| 5 | JOFS5 | NN=1 CN=8 | / | / | / | / | / | / | / |
| 6 | JOFS6 | NN=2 CN=9 | / | / | / | / | / | / | / |
| 7 | JOFS7 | NN=3 CN=10 | / | / | / | / | / | / | / |
| 8 | JOFS8 | NN=12 CN=13 →12 | / | / | / | / | / | / | / |
| 9 | JOFS9 | NN=13 CN=14 →13 | / | / | / | / | / | / | / |
| 10 | JOFS10 | NN=14 CN=15 →14 | / | / | / | / | / | / | / |
| 11 | JOFS11 | NN=12 CN=4 | / | / | / | / | / | / | / |
| 12 | JOFS12 | NN=11 CN=4 | NN=8 CN=13 →12 | NN=13 CN=5 | NN=1 CN=11 | IN=0 ON=3 RC=r60 | IN=1 ON=0 RC=r61 | IN=2 ON=1 RC=r62 | IN=3 ON=2 RC=r63 →r63' |
| 13 | JOFS13 | NN=12 CN=5 | NN=9 CN=14 | NN=14 CN=6 | / | IN=1 ON=0 RC=r71 | IN=2 ON=1 RC=r72 | / | / |
| 14 | JOFS14 ↓ JOFS14' | NN=13 CN=6 | NN=10 CN=15 →14 | NN=15 CN=7 | NN=3 CN=15 | IN=1 ON=0 RC=r80 | IN=2 ON=1 RC=r81 | / | / |
| 15 | JOFS15 ↓ JOFS15' | NN=14 CN=7 | / | / | / | / | / | / | / |

JN: CONNECTED RECORD NUMBER  JOFS: OFFSET OF CONNECTED RECORD
LN: LINKED RECORD NUMBER     RN: REGULATED RECORD NUMBER
NN: ADJACENT NODE INFORMATION  CN: LINKED COST INFORMATION
IN: ENTRY LINK INFORMATION     ON: EXIT LINK INFORMATION
RC: INTER-LINK REGULATED CODE

HATCHED PART INDICATE NON-PRESENCE OF TARGET LINKED RECORD, REGULATED RECORD

FIG.11

COST TABLE

| COST RECORD NUMBER | LINK LENGTH | AVERAGE TRAVELING TIME | WIDTH INFORMATION |
|---|---|---|---|
| 0 | LL0 | TT0 | W0 |
| 1 | LL1 | TT1 | W1 |
| 2 | LL2 | TT2 | W2 |
| 3 | LL3 | TT3 | W3 |
| 4 | LL4 | TT4 | W4 |
| 5 | LL5 | TT5 | W5 |
| 6 | LL6 | TT6 | W6 |
| 7 | LL7 | TT7 | W7 |
| 8 | LL8 | TT8 | W8 |
| 9 | LL9 | TT9 | W9 |
| 10 | LL10 | TT10 | W10 |
| 11 | LL11 | TT11 | W11 |
| ~~12~~ | ~~LL12~~ | ~~TT12~~ | ~~W12~~ |
| 13→12 | LL13 | TT13 | W13 |
| 14→13 | LL14 | TT14 | W14 |
| 15→14 | LL15 | TT15 | W15 |
| 15 | LL16 | TT16 | W16 |

UPDATING OPERATION INFORMATION

UPDATE SEGMENT

UPDATED RECORD (OFFSET TYPE)

UPDATED RECORD (RECORD TYPE)

FIG.14A

DATA TYPE INFORMATION

| VALUE | DATA TYPE |
|---|---|
| 0 | ROUTE CALCULATION HEADER OF ROUTE CALCULATION DATA |
| 1 | NODE TABLE OF ROUTE CALCULATION DATA |
| 2 | CONNECTION INFORMATION OF ROUTE CALCULATION DATA |
| 3 | COST TABLE OF ROUTE CALCULATION DATA |
| ⋮ | ⋮ |

FIG.14B

UPDATE TYPE INFORMATION

| VALUE | UPDATING OPERATION |
|---|---|
| 0 | DELETION |
| 1 | SUBSTITUTION |
| 2 | ADDITION |

FIG.14C

UPDATING POSITION DIVISION

| VALUE | DIVISION |
|---|---|
| 0 | OFFSET TYPE |
| 1 | FIXED LENGTH RECORD TYPE |
| 2 | VARIABLE LENGTH RECORD TYPE |

FIG.15

| UPDATE SEGMENT | UPDATE SEGMENT HEADER | | | | UPDATED RECORD | |
|---|---|---|---|---|---|---|
| | DATA TYPE INFOR-MATION | UPDATE TYPE INFOR-MATION | UPDATING POSITION DIVISION | NUMBER OF UPDATED RECORDS | | |
| #0 | 0 | 1 | 0 | 1 | #0 | HEAD OFFSET=12<br>UPDATED DATA SIZE=8<br>UPDATE PART DATA=SSSS, OOOO |
| #1 | 1 | 1 | 1 | 2 | #0 | HEAD RECORD NUMBER=2<br>NUMBER OF UPDATED RECORDS=2<br>UPDATE PART RECORD #0=NRec[2]<br>UPDATE PART RECORD #1=NRec[3] |
| | | | | | #1 | HEAD RECORD NUMBER=13<br>NUMBER OF UPDATED RECORDS=3<br>UPDATE PART RECORD #0=NRec[13]<br>UPDATE PART RECORD #1=NRec[14]<br>UPDATE PART RECORD #2=NRec[15] |
| #2 | 2 | 1 | 2 | 2 | #0 | HEAD RECORD NUMBER=8<br>NUMBER OF UPDATED RECORDS=3<br>UPDATE PART RECORD #0=JRec[8]<br>UPDATE PART RECORD #1=JRec[9]<br>UPDATE PART RECORD #2=JRec[10] |
| | | | | | #1 | HEAD RECORD NUMBER=12<br>NUMBER OF UPDATED RECORDS=1<br>UPDATE PART RECORD #0=JRec[12] |
| #3 | 2 | 0 | 2 | 2 | #0 | HEAD RECORD NUMBER=2<br>NUMBER OF UPDATED RECORDS=2 |
| | | | | | #1 | HEAD RECORD NUMBER=13<br>NUMBER OF UPDATED RECORDS=2 |
| #4 | 2 | 2 | 2 | 2 | #0 | HEAD RECORD NUMBER=4<br>NUMBER OF UPDATED RECORDS=2<br>UPDATE PART RECORD #0=JRec[2]<br>UPDATE PART RECORD #1=JRec[3] |
| | | | | | #1 | HEAD RECORD NUMBER=15<br>NUMBER OF UPDATED RECORDS=2<br>UPDATE PART RECORD #0=JRec[13]<br>UPDATE PART RECORD #1=JRec[14] |
| #5 | 3 | 0 | 1 | 1 | #0 | HEAD RECORD NUMBER=12<br>NUMBER OF UPDATED RECORDS=1 |
| #6 | 3 | 2 | 1 | 1 | #0 | HEAD RECORD NUMBER=16<br>NUMBER OF UPDATED RECORDS=1<br>UPDATE PART RECORD #0=CRec[15] |

SSSS: 4-BYTE DATA INDICATING DATA SIZE OF CONNECTION INFORMATION AFTER UPDATING
OOOO: 4-BYTE DATA INDICATING OFFSET OF COST TABLE HEAD AFTER UPDATING
NRec[n]: NODE RECORD WHERE NODE NUMBER OF FIG. 9 IS n
JRec[j]: CONNECTED RECORD WHERE CONNECTED RECORD NUMBER OF Fig. 10 IS j
CRec[c]: COST RECORD WHERE COST RECORD NUMBER OF FIG. 11 IS c

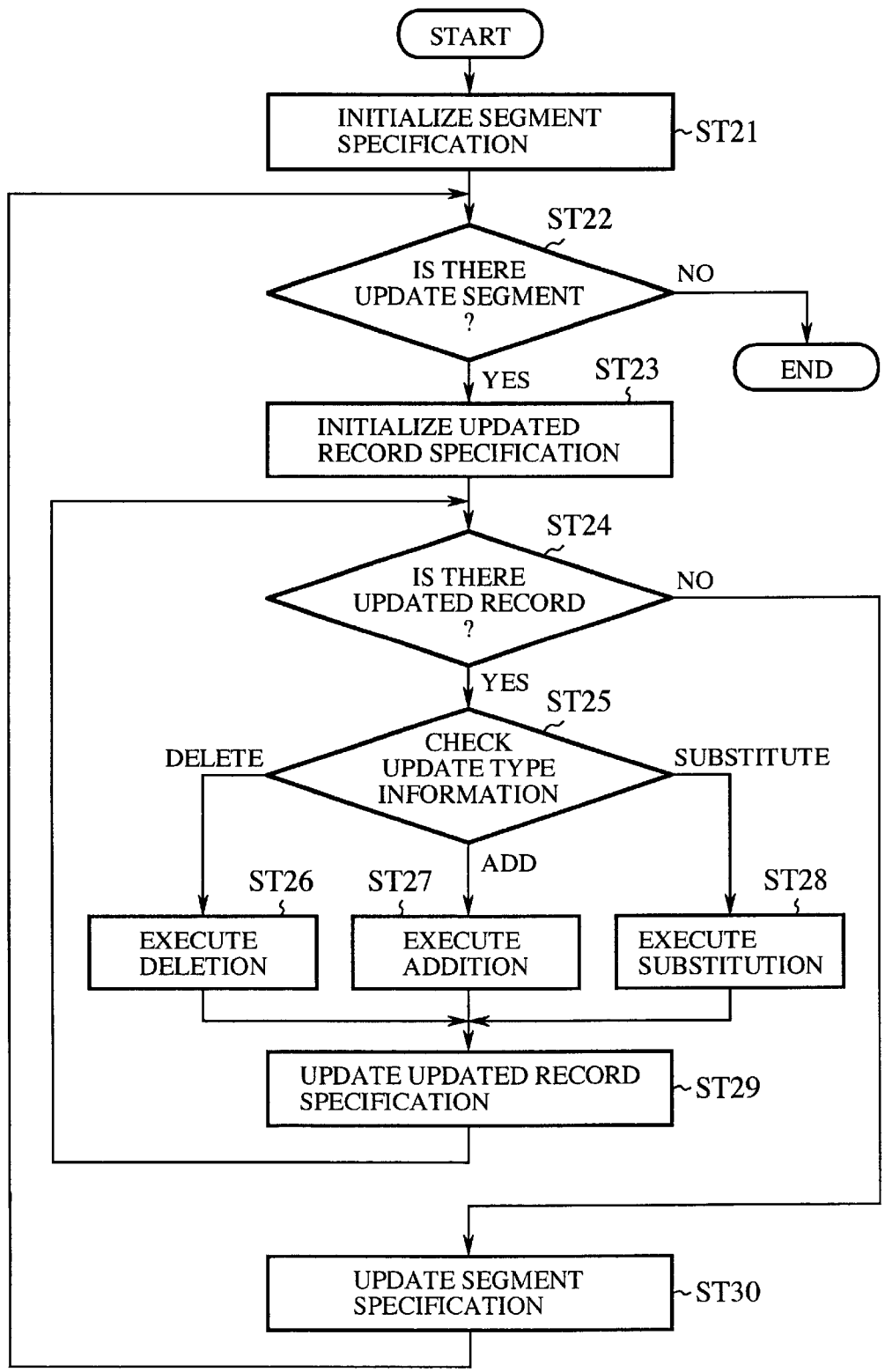

FIG.18 UPDATE TYPE INFORMATION

| VALUE | UPDATING OPERATION |
|-------|--------------------|
| 0 | DELETION |
| 1 | SUBSTITUTION |
| 2 | ADDITION |
| 3 | SINGLE TYPE PARTIAL UPDATING |
| 4 | COMPOSITE TYPE PARTIAL UPDATING |

UPDATED RECORD

PARTIALLY UPDATED RECORD (RECORD TYPE)

PARTIALLY UPDATED RECORD (OFFSET TYPE)

FIG.20A
UPDATED RECORD
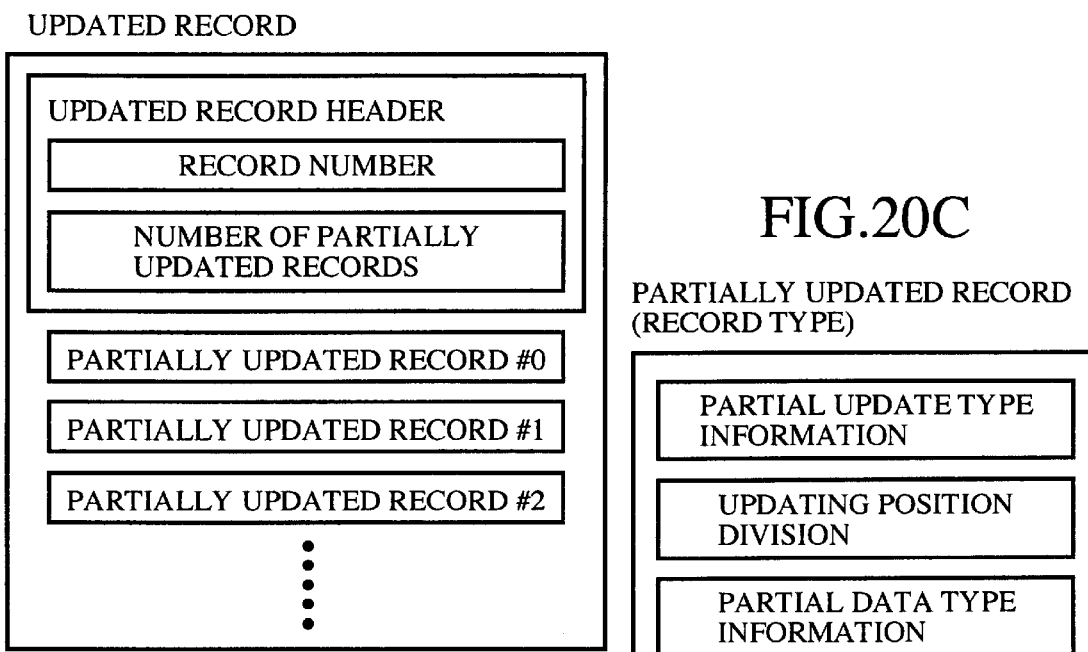
FIG.20B
PARTIALLY UPDATED RECORD (OFFSET TYPE)
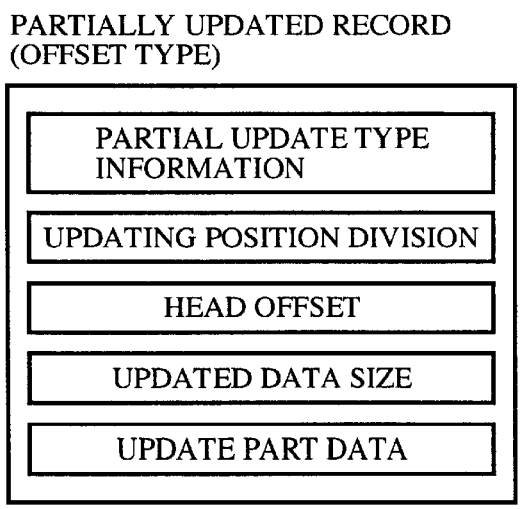
FIG.20C
PARTIALLY UPDATED RECORD (RECORD TYPE)
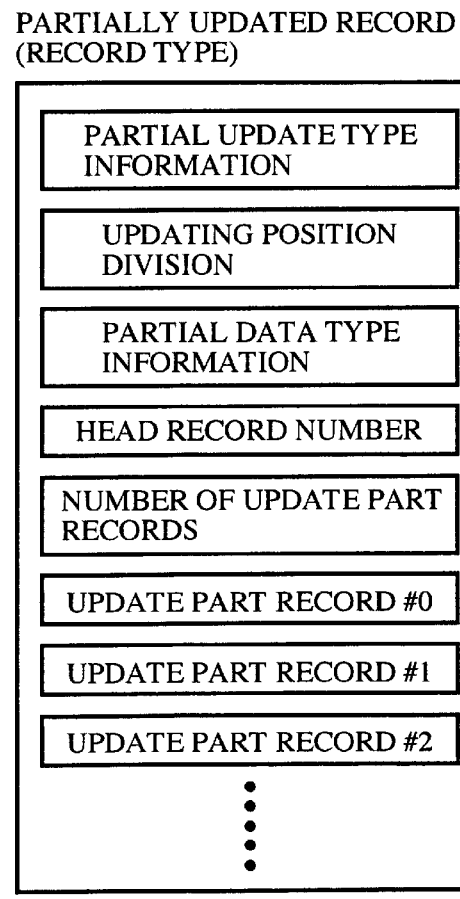
FIG.21
| VALUE | DATA TYPE |
|---|---|
| 0 | LINKED RECORD ARRAY |
| 1 | REGULATED RECORD ARRAY |

FIG.22A

SINGLE TYPE PARTIAL UPDATING OF NODE RECORD

| UPDATED RECORD HEADER | RECORD NUMBER=15<br>UPDATE TYPE INFORMATION=1<br>UPDATING POSITION DIVISION=0<br>NUMBER OF PARTIALLY UPDATED RECORDS=1 |
|---|---|
| PARTIALLY UPDATED RECORD #0 | HEAD OFFSET=10<br>UPDATED DATA SIZE=2<br>UPDATE PART DATA=JOFS15' |

FIG.22B

SINGLE TYPE PARTIAL UPDATING OF CONNECTED RECORD

| UPDATED RECORD HEADER | RECORD NUMBER=12<br>UPDATE TYPE INFORMATION=1<br>UPDATING POSITION DIVISION=1<br>NUMBER OF PARTIALLY UPDATED RECORDS=2 |
|---|---|
| PARTIALLY UPDATED RECORD #0 | PARTIAL DATA TYPE=0<br>HEAD RECORD NUMBER=1<br>NUMBER OF UPDATE PART RECORDS=1<br>UPDATE PART RECORD #0 =JRecL[12][1] |
| PARTIALLY UPDATED RECORD #1 | PARTIAL DATA TYPE=1<br>HEAD RECORD NUMBER=3<br>NUMBER OF UPDATE PART RECORDS=1<br>UPDATE PART RECORD #0 =JRecR[12][3] |

JRecL[j][p]: CONTENT OF LINKED RECORD WHERE LINKED RECORD NUMBER OF CONNECTED RECORD OF CONNECTED RECORD NUMBER j OF FIG.10 IS p

JRecR[j][p]: CONTENT OF REGULATED RECORD WHERE REGULATED RECORD NUMBER OF CONNECTED RECORD OF CONNECTED RECORD NUMBER j OF FIG.10 IS p

FIG.23

COMPOSITE TYPE PARTIAL UPDATING OF CONNECTED RECORD

| UPDATED RECORD HEADER | RECORD NUMBER=14<br>NUMBER OF PARTIALLY UPDATED RECORDS=2 |
|---|---|
| PARTIALLY UPDATED RECORD #0 | UPDATE TYPE INFORMATION=1<br>UPDATING POSITION DIVISION=1<br>PARTIAL DATA TYPE=0<br>HEAD RECORD NUMBER=1<br>NUMBER OF UPDATE PART RECORDS=1<br>UPDATE PART RECORD #0=JRecR[12][1] |
| PARTIALLY UPDATED RECORD #1 | UPDATE TYPE INFORMATION=2<br>UPDATING POSITION DIVISION=1<br>PARTIAL DATA TYPE=1<br>HEAD RECORD NUMBER=3<br>NUMBER OF UPDATE PART RECORDS=1<br>UPDATE PART RECORD #0=JRecL[12][3] |

JRecL[j][p]: CONTENT OF LINKED RECORD WHERE LINKED RECORD NUMBER OF CONNECTED RECORD OF CONNECTED RECORD NUMBER j OF FIG.10 IS p

UPDATING OPERATION INFORMATION
STORAGE SECTION

MAP BUFFER

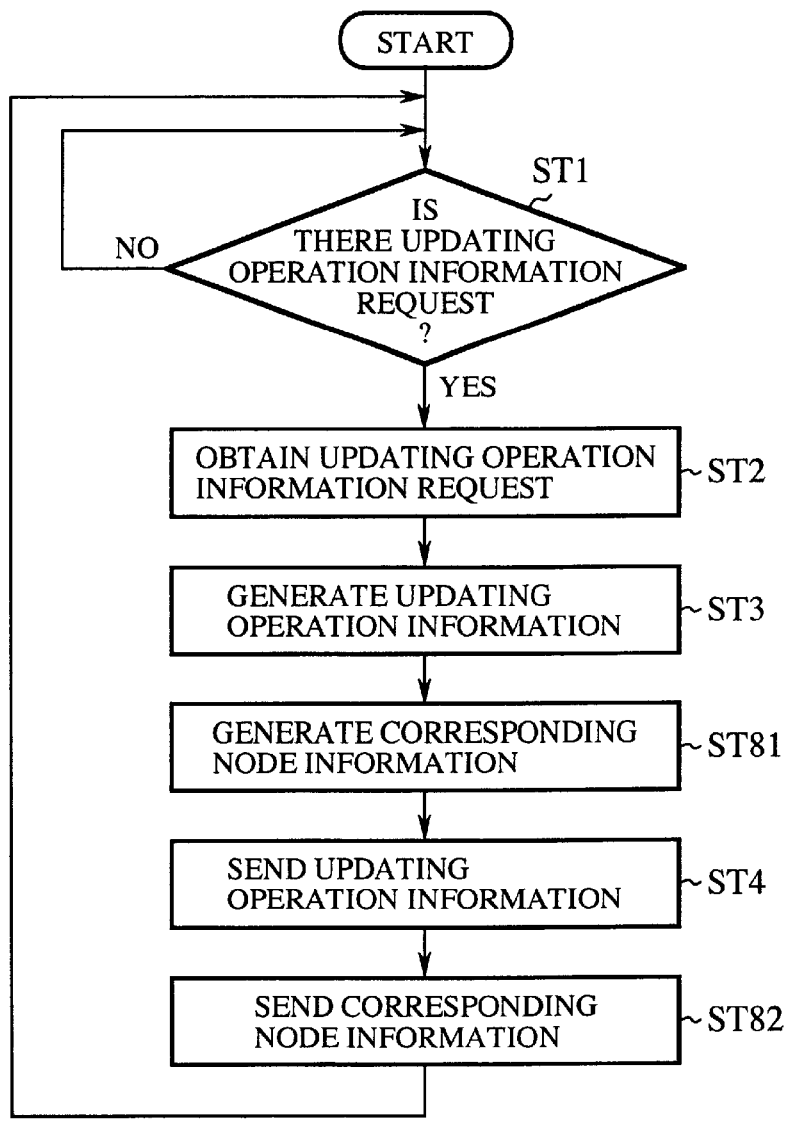

| NODE | NODE RECORD NUMBER |
|---|---|
| N00 | 0 |
| N01 | 1 |
| N02 | 2 |
| N03 | 3 |
| N04 | 4 |
| N05 | 5 |
| N06 | 6 |

| NODE | NODE RECORD NUMBER |
|---|---|
| N30 | 0 |
| N31 | 1 |
| N32 | 2 |
| N33 | 3 |
| N34 | 4 |
| N35 | 5 |
| N36 | 6 |

| LINKED RECORD NUMBER | ADJACENT NODE INFORMATION | LINK COST INFORMATION | ADJACENT NUMBER |
|---|---|---|---|
| 0 | 0 | c00 | 0 |
| 1 | 0 | INVALID VALUE | 3 | c00: COST RECORD NUMBER OF LINK BETWEEN N00 AND N04

| NODE | NODE RECORD NUMBER |
|------|--------------------|
| N00  | 0                  |
| N01  | 1                  |
| N02  | 2                  |
| N04  | 4→3                |
| N05  | 5→4                |
| N06  | 6→5                |

| NODE | NODE RECORD NUMBER |
|------|--------------------|
| N31  | 1→0                |
| N32  | 2→1                |
| N33  | 3→2                |
| N34  | 4→3                |
| N35  | 5→4                |
| N36  | 6→5                |

FIG.35A
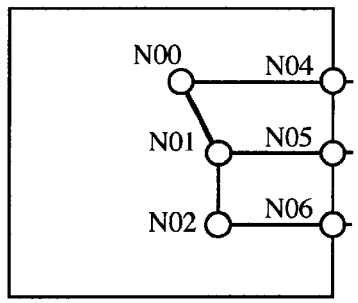
FIG.35B
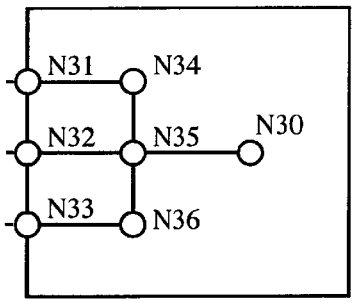
FIG.35C
| NODE | NODE RECORD NUMBER |
|---|---|
| N00 | 0 |
| N01 | 1 |
| N02 | 2 |
| N04 | 3 |
| N05 | 4 |
| N06 | 5 |
FIG.35D
| NODE | NODE RECORD NUMBER |
|---|---|
| N30 | 0 |
| N31 | 1 |
| N32 | 2 |
| N33 | 3 |
| N34 | 4 |
| N35 | 5 |
| N36 | 6 |
FIG.35E
| NODE | LINKED RECORD NUMBER | ADJACENT NODE INFORMATION | LINKED COST INFORMATION | ADJACENT NUMBER |
|---|---|---|---|---|
| N04 | 0 | 0 | c00 | 0 |
|  | 1 | 0 | INVALID VALUE | 3 |
| N05 | 0 | 1 | c01 | 0 |
|  | 1 | 1 | INVALID VALUE | 3 |
| N06 | 0 | 2 | c02 | 0 |
|  | 1 | 2 | INVALID VALUE | 3 |
FIG.35F
| NODE | LINKED RECORD NUMBER | ADJACENT NODE INFORMATION | LINKED COST INFORMATION | ADJACENT NUMBER |
|---|---|---|---|---|
| N31 | 0 | 4 | c31 | 0 |
|  | 1 | 4 | INVALID VALUE | 3 |
| N32 | 0 | 5 | c32 | 0 |
|  | 1 | 5 | INVALID VALUE | 3 |
| N33 | 0 | 6 | c33 | 0 |
|  | 1 | 6 | INVALID VALUE | 3 |

FIG.36A

| NODE | NODE RECORD NUMBER OF VERSION VX | NODE RECORD NUMBER OF VERSION V |
|---|---|---|
| N04 | 3 | 4 |
| N05 | 4 | 5 |
| N06 | 5 | 6 |

FIG.36B

| NODE | NODE RECORD NUMBER OF VERSION VX | NODE RECORD NUMBER OF VERSION V |
|---|---|---|
| N31 | 0 | 1 |
| N32 | 1 | 2 |
| N33 | 2 | 3 |

CORRESPONDING NODE INFORMATION

CORRESPONDING NODE TABLE

CORRESPONDING RECORD

FIG.38A

CORRESPONDING NODE TABLE

| | | |
|---|---|---|
| CORRESPONDING NODE HEADER | MAP DATA IDENTIFICATION INFORMATION | Ma |
| | CORRESPONDING VERSION INFORMATION VERSION 0 | VX |
| | CORRESPONDING VERSION INFORMATION VERSION 1 | V |
| | ADJACENT MAP DATA INFORMATION | 3 |
| | NUMBER OF CORRESPONDING RECORDS | 3 |
| CORRESPONDING RECORD #0 | NODE RECORD NUMBER 0 | 3 |
| | NODE RECORD NUMBER 1 | 4 |
| CORRESPONDING RECORD #1 | NODE RECORD NUMBER 0 | 4 |
| | NODE RECORD NUMBER 1 | 5 |
| CORRESPONDING RECORD #2 | NODE RECORD NUMBER 0 | 5 |
| | NODE RECORD NUMBER 1 | 6 |

FIG.38B

CORRESPONDING NODE TABLE

| | | |
|---|---|---|
| CORRESPONDING NODE HEADER | MAP DATA IDENTIFICATION INFORMATION | Mb |
| | CORRESPONDING VERSION INFORMATION VERSION 0 | VX |
| | CORRESPONDING VERSION INFORMATION VERSION 1 | V |
| | ADJACENT MAP DATA INFORMATION | 7 |
| | NUMBER OF CORRESPONDING RECORDS | 3 |
| CORRESPONDING RECORD #0 | NODE RECORD NUMBER 0 | 0 |
| | NODE RECORD NUMBER 1 | 1 |
| CORRESPONDING RECORD #1 | NODE RECORD NUMBER 0 | 1 |
| | NODE RECORD NUMBER 1 | 2 |
| CORRESPONDING RECORD #2 | NODE RECORD NUMBER 0 | 2 |
| | NODE RECORD NUMBER 1 | 3 |

CORRESPONDING NODE TABLE
STORAGE SECTION

DELETE THE LINK BETWEEN N2 AND N5
DELETE THE LINK BETWEEN N5 AND N7
ADD LINK BETWEEM N3 AND N6
DELETE N5 AND N7

FIG.43A
(PRIOR ART)
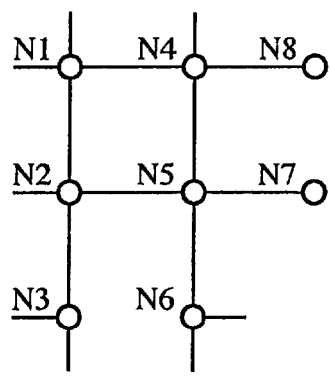
FIG.43B
(PRIOR ART)
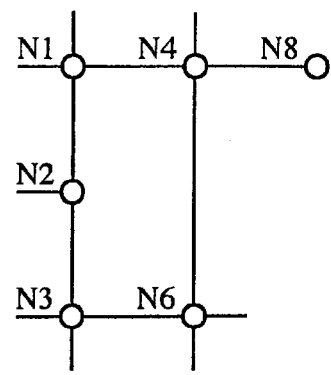
FIG.43C
(PRIOR ART)
| NODE | NODE NUMBER OF (a) | NODE NUMBER OF (b) |
|---|---|---|
| N1 | 0 | 0 |
| N2 | 1 | 1 |
| N3 | 2 | 2 |
| N4 | 3 | 3 |
| N5 | 4 | NONE |
| N6 | 5 | 4 |
| N7 | 6 | NONE |
| N8 | 7 | 5 | ns # MAP DATA PROCESSING APPARATUS AND METHOD OF THE SAME

BACKGROUND OF THE INVENTION

1. Field of the Invention

The present invention relates to a map data processing apparatus and a method thereof, for updating map data used by mobile units, e.g., a car navigation system, a portable telephone set, a personal digital assistant, and so on.

2. Description of Related Art

FIG. 42 is a constitutional view showing a conventional map data processing apparatus disclosed in, for example, Japanese Patent Application Laid-Open No. 11-95657. In the drawing, a reference numeral 1 denotes an information center for generating update information of map data; 2 denotes a transmitter for transmitting the update information generated by the information center 1; 3 denotes a receiver for receiving the update information; 13 denotes a map data storage device for storing the map data; 5 denotes a map data processor for specifying a part of the map data to be changed and a changing content in response to the update information received by the receiver 3, and then changing the map data; 6 denotes an input device; and 7 denotes an output device.

In FIGS. 43A to 43C, FIG. 43A is a view illustrating a road net before the updating of a certain area, which is represented by a node and a link; FIG. 43B is a view illustrating the road net after the updating of a certain area, which is represented by a node and a link; and FIG. 43C is a view illustrating a node number allocated to each node for making reference to the nodes of FIG. 43A and FIG. 43B.

Next, the operation will be described.

The information center 1 transmits update information used to update the map data of each area to a latest version through the transmitter 2. For example, when the road net is updated from FIG. 43A to FIG. 43B, the information center 1 transmits update information indicating that links between the nodes N2 and N5, and between the nodes N5 and N7 of the area have been deleted, a link has been added between nodes N3 and N6, and the nodes N5 and N7 have been deleted.

Upon having received the above-described update information through the receiver 3, the map data processor 5 takes out the map data of the road net FIG. 4A stored in the map data storage device 13, and executes updating for the map data based on the update information.

As a result, map data representing the road net (FIG. 43B) is constructed, and the map data of the road net (FIG. 43B) is stored in the map data storage device 13.

Because of the foregoing configuration of the conventional map data processing apparatus, as update information, information indicating the addition/deletion of nodes and links constituting the road net is used. However, the map data representing the road net is composed of not only data corresponding, one to one, to a node or a link, but also data indicating an adjacency relation between a node and a link, data indicating traffic regulation between links, and so on. Such data of various types are in close relation to one another. Accordingly, the map data processor 5 must calculate the type of data, a part to be changed, and a changing content from the addition/deletion information of the node or the link as update information. Therefore, a load placed on the map data processor 5 is excessively enlarged, which causes a drawback including the difficulty of performing quick updating, and so on.

In addition, there may be a case where the transmission of update information from the transmitter 2 to the receiver 3 is interrupted, making it impossible to receive the update information of a certain area. Because of the impossibility of updating the map data of the area, the map data of a latest version and the map data of an old version may be stored in a mixed manner in the map data storage device 13. In the map data representing the road net, the nodes are disposed in a predetermined order, and reference is made to a desired node by using its node number in the arraying order. However, as shown in FIG. 43C, node addition/deletion causes a change in the node numbers, and a different node number is allocated if a version is different though a similar node is used.

Each map data contains a node number for referring to the node of an adjacent area, i.e., an adjacent area node number, in order to show the connection of the road net between the adjoined areas. However, since the adjacent area node number indicates the node of the adjacent area of a version identical to that of the area concerned, if the version of the adjacent area is different from that of the area, the adjacent area node number indicates a different node, causing mismatching between the adjacent map data of different versions. As described above, there may be a case where the map data of different version are present in a mixed manner in the map data storage device 13. Therefore, mismatching occurred between the adjacent map data, which causes a drawback including the impossibility of processing map data, and so on.

SUMMARY OF THE INVENTION

The present invention was made to solve the foregoing problems, and objects of the invention are to provide an apparatus and a method for processing map data, capable of quickly updating the map data.

Other objects of the invention are to provide an apparatus and a method for processing map data, capable of preventing mismatching between the map data of different versions.

In accordance with an aspect of the invention, there is provided a map data processing apparatus, comprising: storing means for storing map data; information obtaining means for obtaining updating operation information indicating an updating content of the map data stored in the storing means; and updating means for updating the map data stored in the storing means according to the updating operation information obtained by the information obtaining means.

According to the map data processing apparatus of the invention, the information obtaining means obtains updating operation information containing updating position information, a part to be updated being represented by an offset from a predetermined reference position in the map data therein.

According to the map data processing apparatus of the invention, the information obtaining means obtains updating operation information containing, among data included in the map data, data specifying information for specifying data to be updated, and updating position information indicating a record having the data stored therein.

According to the map data processing apparatus of the invention, the information obtaining means obtains updating operation information containing updating position information indicating at least one or more updating positions in the record.

According to the map data processing apparatus of the invention, the information obtaining means obtains updating operation information containing update type information indicating update types of at least one or more parts to be updated in the record.

According to the map data processing apparatus of the invention, data storing means is provided for storing the updating operation information obtained by the information obtaining means when updating time by the updating means exceeds a predetermined reference time, and storing map data after updating by the updating means when the updating time is less than the predetermined time.

According to the map data processing apparatus of the invention, data storing means is provided for storing the updating operation information obtained by the information obtaining means when estimated updating time by the updating means exceeds a predetermined reference time, and storing map data after updating by the updating means when the estimated updating time is less than the predetermined reference time.

In accordance with another aspect of the invention, there is provided a map data processing apparatus, comprising: storing means for storing map data; information obtaining means for obtaining updating information the map data stored in the storing means; and updating means for updating the map data stored in the storing means according to the updating information obtained by the information obtaining means. In this case, the information obtaining means obtains corresponding node information indicating a correspondence between identical nodes of respective versions when the storing means stores map data, where a version of a certain area is different from that of the other area.

According to the map data processing apparatus of the invention, the information obtaining means obtains corresponding node information only when versions of areas adjacent to each other are different, the corresponding node information obtained regarding identical nodes present in the areas adjacent to each other.

According to the map data processing apparatus of the invention, the information obtaining means obtains only corresponding node information of the same node present in an overlapped part of the areas adjacent to each other.

In accordance with yet another aspect of the invention, there is provided a map data processing method, comprising the steps of: obtaining updating operation information indicating an updating content of stored map data; and updating the map data according to the obtained updating operation information.

According to the map data processing method of the invention, updating operation information is obtained, containing updating position information, a part to be updated being represented by an offset from a predetermined reference position in the map data therein.

According to the map data processing method of the invention, updating operation information is obtained, containing data specifying information for specifying data to be updated, and updating position information indicating a record having the data stored therein, among data included in the map data.

According to the map data processing method of the invention, updating operation information is obtained, containing updating position information indicating at least one or more updating positions in a record.

According to the map data processing method of the invention, updating operation information is obtained, containing update type information indicating update types of at least one or more parts to be updated in the record.

According to the map data processing method of the invention, the obtained updating operation information is stored when updating time of the map data exceeds a predetermined reference time, and the map data after updating is stored when the updating time is less than the predetermined reference time.

According to the map data processing method of the invention, the obtained updating operation information is stored when estimated updating time of the map data exceeds a predetermined reference time, and the map data after updating is stored when the estimated updating time is less than the predetermined reference time.

In accordance with a further aspect of the invention, there is provided a map data processing method, comprising the steps of: obtaining updating information of stored map data; and updating the map data according to the obtained updating information. In this case, if there is map data stored, where a version of a certain area is different from that of the other area, corresponding node information indicating a correspondence between identical nodes of the respective versions is obtained.

According to the map data processing method of the invention, corresponding node information is obtained only when versions of areas adjacent to each other are different, the corresponding node information obtained regarding identical nodes present in the areas adjacent to each other.

According to the map data processing apparatus of the invention, only corresponding node information of the same node present in an overlapped part of the areas adjacent to each other is obtained.

BRIEF DESCRIPTION OF THE DRAWINGS

FIGS. 5A to 5J are views, each showing an example of a data structure of route calculation data;

FIG. 6 is a view illustrating a content of a node table of the route calculation data of the data structure shown in each of FIGS. 5A to 5J regarding the road net of FIG. 4A;

FIG. 7 is a view illustrating a content of connection information of the route calculation data of the data structure shown in each of FIGS. 5A to 5J regarding the road net of FIG. 4A;

FIG. 8 is a view illustrating a content of a costs table of the route calculation data of the data structure shown in each of FIGS. 5A to 5J regarding the road net of FIG. 4A;

FIG. 9 is a view illustrating contents of a node table, connection information and a cost table corresponding to the road net of FIG. 4B;

FIG. 10 is a view illustrating contents of the node table, the connection information and the cost table corresponding to the road net of FIG. 4B;

FIG. 11 is a view illustrating contents of the node table, the connection information and the cost table corresponding to the road net of FIG. 4B;

FIGS. 14A to 14C are views, each showing definition of data used for updating operation information;

FIG. 15 is a view showing updating operation information of the data structure shown in each of FIGS. 13A to 13D;

FIG. 17 is a flowchart showing in detail a processing of step ST18;

FIG. 18 is a flowchart showing definition of update type information in the updating operation information of each of FIGS. 13A to 13D;

FIGS. 20A to 20C are views, each illustrating a data structure of an update record when update type information indicates composite type partial updating;

FIG. 21 is a view showing a definition example of partial data type information in a connection record of the route calculation data connection information shown in each of FIGS. 5A to 5J;

FIGS. 22A and 22B are views, each showing an example of the data record of the data structure shown in each of FIGS. 19A to 19C;

FIG. 23 is a view showing an example of an update record for instructing composite type particle updating of a connection record of connection information;

FIG. 31 is a flowchart showing an operation of the map data providing station according to the fourth embodiment;

FIG. 32 is a view illustrating a relation among areas of map data;

FIGS. 35A to 35F are views, each showing an example of a road net;

FIGS. 36A and 36B are views, each showing a correspondence between node record numbers;

FIGS. 38A and 38B are views, each showing an example of a corresponding node table of the data structure shown in each of FIGS. 37A to 37C;

FIGS. 43A to 43C are views, each showing a road net represented by a node and a link.

DETAILED DESCRIPTION OF THE PREFERRED EMBODIMENTS

An embodiment of the present invention will be described below.

Embodiment 1

Figure 1:
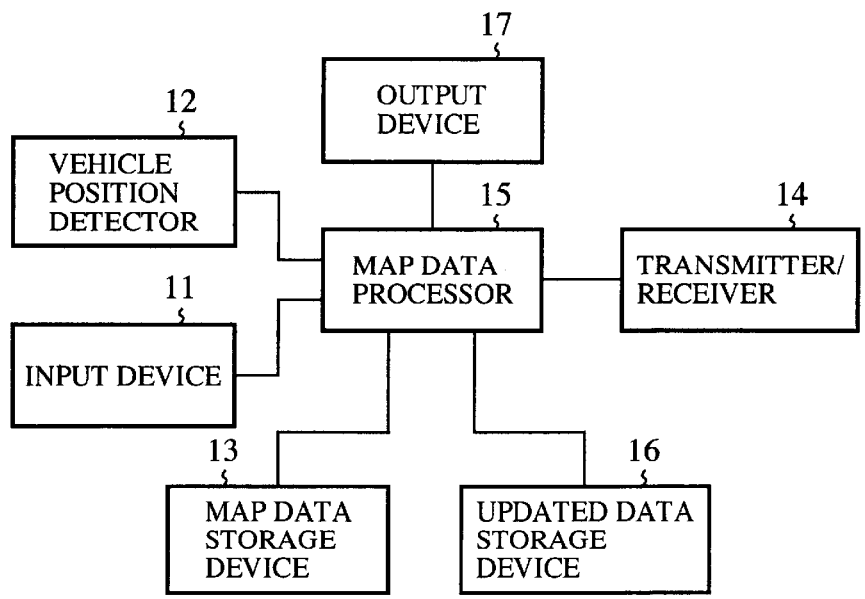
FIG. 1 is a constitutional view showing map data processing apparatus according to first to fourth embodiments of the prevent invention.

FIG. 1 is a constitutional view showing a map data processing apparatus according to the first embodiment of the invention. In the drawing, a reference numeral 11 denotes an input device for entering information or the like regarding the operation of the map data processing apparatus; 12 denotes a vehicle position detector for detecting the position of a vehicle having the map data processing apparatus loaded thereon by using a GPS receiver or the like; and 13 denotes a map data storage device (storing means) for storing map data.

A reference numeral 14 denotes a transmitter/receiver (information obtaining means) using a portable telephone set or the like for receiving updating operation information indicating the updating content of map data, and transmitting/receiving various bits of information with a map data providing station through a communication network; and 15 denotes a map data processor (updating means) for performing: map matching designed to identify a road, on which a vehicle is traveling, and its position on the road, based on a vehicle position detected by the vehicle position detector 12 and map data stored in the map data storage device 13; route calculation designed to calculate a route from a starting point to a destination by using the map data; route guiding designed to guide the vehicle from the starting point to the destination; map displaying of the surroundings of the vehicle position; and various other navigation operations; and also updating the map data stored in the map data storage device 13 under the updating operation information indicating the updating content, received by the transmitter/receiver 14. In this case, the updating operation information indicating the updating content contains updating position information indicating a part to be updated, update type information indicating the type of updating such as replacement, deletion, addition, or the like, and data of the part to be updated, e.g., replace, added or the like.

A reference numeral 16 denotes an update data storage device for storing the map data updated by the map data processor 15; and 17 denotes an output device for displaying or outputting, by voice, a map, a vehicle position, a route, guiding information, and so on, under the instruction of the map data processor 15.

Figure 2:
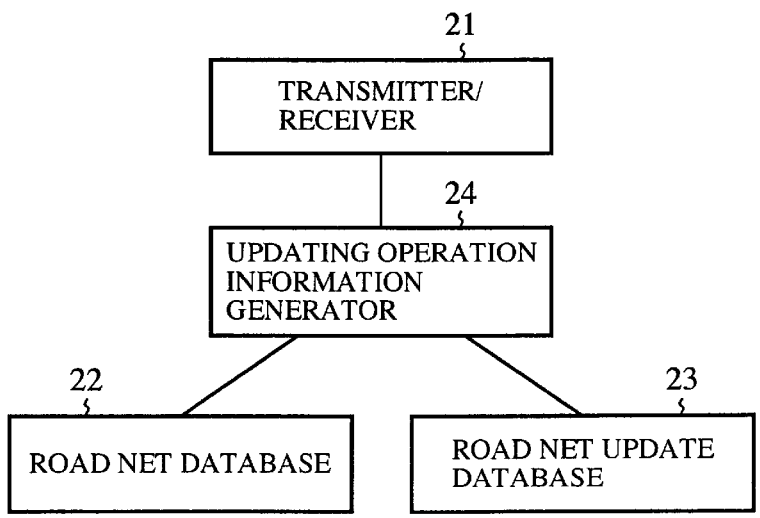
FIG. 2 is a constitutional view showing a map data providing station of each of the first to fourth embodiments.

FIG. 2 is a constitutional view showing the map data providing station. In the drawing, a reference numeral 21 denotes a transmitter/receiver composed of a model or the like to transfer data with the transmitter/receiver 14 through the communication network; 22 denotes a road net database for storing road net data managed for each version; 23 denotes a road net update database for storing road net update data indicating how the road net was updated between versions; and 24 denotes an updating operation information generator for generating updating operation information of the road net data between versions in the map data processor 15 after referring to the road net database 22 and the road net update database 23.

Figure 3:
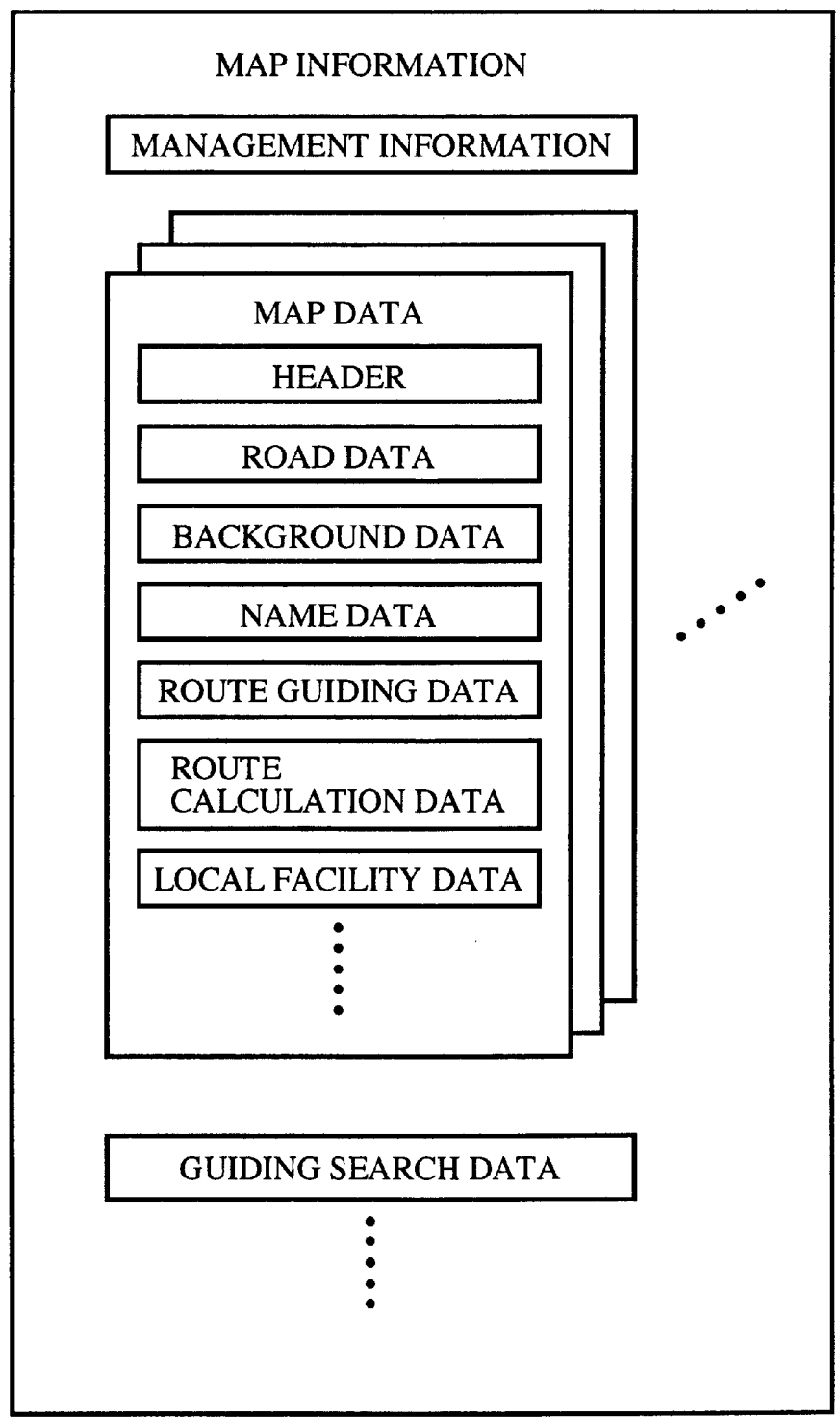
FIG. 3 is a view showing an example of map data.

FIG. 3 is a view showing an example of map data stored in the map data storage device 13, the update data storage device 16, and the road net database 22.

As map information, there are management information, several map data, guiding search data, and various other data.

Each map data is provided corresponding to each area when the whole country is divided into several areas. Information indicating the map of a corresponding area is contained in the map data.

Management information is data which is prepared to manage the map data. The management information contains information on the location of the map data in the map information, version information for managing stored old/new information, and so on.

The map data contains road data used for map matching, road displaying or the like; background data used for displaying a map background such as a river, sea or the like; name data used for displaying a name of a place, a name or the like; route guiding data used for route guiding; route calculation data used for calculating a route; local facility data used for searching local facilities, and so on. The map data also contains various attributes regarding the map data of information or the like indicating the area concerned, and a header having information used for managing the locations of various data or the like.

Figure 4A:
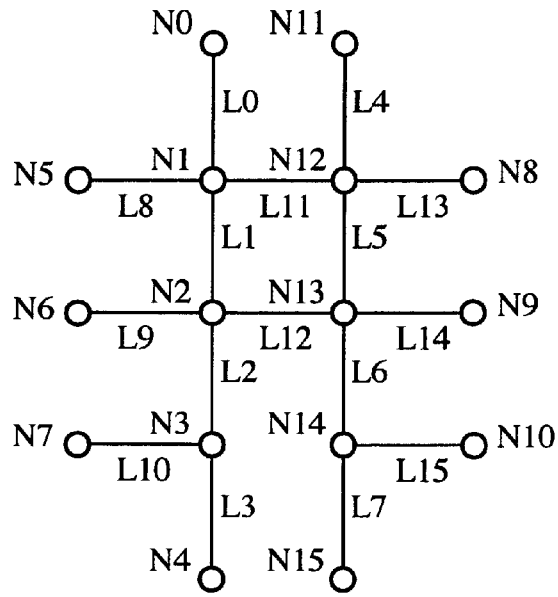
FIGS. 4A and 4B are views, each illustrating a road net of a certain area.
Figure 4B:
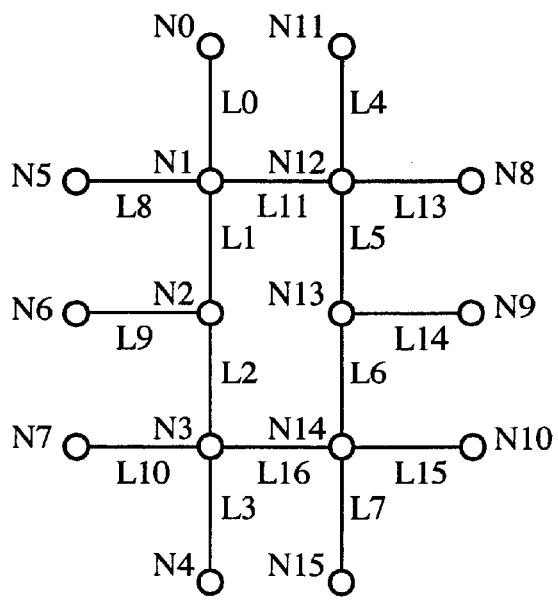

FIGS. 4A and 4B are views, each showing the road net of a certain area. In the drawings, N0 to N15 denote nodes indicating points of intersection; and L0 to L16 links indicating a road for interconnecting the points of intersection.

FIG. 4A shows the road net of the above-described area during a certain period; and FIG. 4B a latest road net, where the link L12 of the road net of FIG. 4A is abolished and the road of the link L16 is newly established.

FIGS. 5A to 5J are views, each showing an example of a data structure of route calculation data. FIG. 5A shows the structure of the route calculation data, which is composed of a route calculation header, a node table, connection information, and a cost table.

FIG. 5B shows the structure of the route calculation header, where offsets and data sizes are shown to indicate the locations of a node table, connection information, and a cost table, each being data of a 4-byte length. The offset represents the data size of data stored from the head of the route calculation data to the head of each data. Each numeral in the drawing denotes an offset from the head of the route calculation header to each data.

FIG. 5C shows the structure of the node table, where the node records of fixed lengths are arrayed, and the node records are provided corresponding, one to one, to the nodes constituting the road net of the area concerned. In addition, to identify a node record, each node record is provided with a node record number as a number in the arraying order of the node records.

FIG. 5F shows the structure of the node record, which is composed of a node coordinate indicating the geographical location of a corresponding node, a node attribute indicating each of various attributes of the nodes, e.g., the presence of a signal, presence on the boundary of the area concerned, and so on, the number of connected links indicating the number of links connected to the node; the number of regulated records indicating the number of regulated records of a corresponding connected record, and the offset of a connected record indicating the location of the corresponding connected record. The offset represents the data size of data stored from the head of the route calculation data to the head of the corresponding connected record.

As described above, the node table shows the location and attribute of each node constituting the road net in the area concerned, the location of the corresponding connected record, and so on.

FIG. 5D shows the structure of the connection information, where the connected records of variable lengths are arrayed, and the connected records are provided corresponding, one to one, to the nodes constituting the road net of the area concerned. Accordingly, each connected record corresponds to each node record by one to one. In addition, to identify a connected record, each connected record is provided with a connected record number as a number in the arraying order of the connected records.

FIG. 5G shows the structure of the connected record, where linked records and regulated records are arrayed, the linked records are provided corresponding, one to one, to the links connected to a corresponding node, and the regulated records are provided, the number of which is equal to the number of traffic regulations present between the links. In addition, to identify a linked record, each linked record is provided with a linked record number as a number in the arraying order of the linked records. To identify a regulated record, each regulated record is provided with a regulated record number as a number in the arraying order of the regulated records.

FIG. 5H shows the structure of the linked record, which is composed of adjacent node information, and link cost information.

In the adjacent node information, a node connected to a node corresponding to the connected record is represented by using its node record number. A node indicated by the adjacent node information is referred to as an adjacent node of the node corresponding to the connected record, and the number of adjacent nodes present is equal to that of the linked records.

The link cost information indicates the location of information regarding costs necessary for traveling from the node corresponding to the connected record to the adjacent node. A cost record corresponding to a link corresponding to the linked record is represented by using its cost record number.

FIG. 5I shows the structure of the regulated record, which is composed of entry link information indicating the link of an entry side by a linked record number, exit link information indicating the link of an exit side by a linked record number, and an inter-link regulated code indicating set traffic regulation for traveling from the link indicated by the entry link information to the link indicated by the exit link information.

As described above, the connection information indicates a relation between the node constituting the road net in the area concerned and the link, the location of a cost record indicating costs necessary for inter-node traveling, and traffic regulation between the links in the node.

FIG. 5E shows the structure of the cost table, where the cost records of fixed lengths are arrayed, and the cost records are provided corresponding, one to one, to the links constituting the road net. In addition, to identify a cost record, each cost record is provided with a cost record number as a number in the arraying order of the cost records.

FIG. 5J shows the structure of the cost record, which is composed of a link attribute indicating each of various link attributes such as a road type of a corresponding link, or the like, a link length indicating the length of a link, average traveling time indicating time required for link traveling, and width information indicating the road width of the link.

As described above, the cost table shows various bits of information necessary for cost calculation required for traveling of the link constituting the road net in the area concerned.

FIG. 6 is a view showing the content of the node table of the route calculation data having the data structure shown in each of FIGS. 5A to 5J regarding the road net of FIG. 4A. Nodes N0 to N15 are respectively provided with the node records of node record numbers 0 to 15.

For example, the node record of a node record number in FIG. 6 corresponds to the node N1 of FIG. 4A, the node N1 is located on a node coordinate (X1, Y1), a node attribute NA1 is provided, and the number of connected links is four, i.e., the links L0, L11, L1 and L8 are connected. The number of regulated records is four, i.e., four traffic regulations are present among the links L0, L11, L1 and L8, and an offset corresponds to the connected record as JOFS1.

FIG. 7 is a view showing the content of the connection information of the route calculation data having the data structure shown in each of FIGS. 5A to 5J regarding the road net of FIG. 4A. The nodes N0 to N15 are respectively provided with the connected records of connected record numbers 0 to 15.

For example, the connected record of a connected record number 1 of FIG. 7 corresponds to the node Bi of FIG. 4A, its head offset is JOFS1, and corresponds to the links L0, L11, L1 and L8, respectively having the linked records of linked record numbers 0, 1, 2 and 3, and the regulated records of regulated record numbers 0, 1, 2 and 3.

The adjacent node information and the linked cost information of the linked record of a linked record number 0 are respectively 0, the adjacent node of the node N1 is node N0, and a cost from the node N1 to the node N0 is a cost record number 0. In other words, the cost is represented by the cost record of the link L0.

The adjacent node information and the linked cost information of the linked record of the linked record number 1 are respectively 12 and 11. The adjacent node of the node N1 is a node N2, and a cost from the node N1 to the node N12 is a cost record number 11. In other words, the cost is represented by the cost record of the link L11.

The adjacent node information and the linked cost information of the link record of the linked record number 2 are respectively 2 and 1. The adjacent node of the node N1 is a node N2, and a cost from the node N1 to the node N2 is a cost record number 1. In other words, the cost is represented by the cost record of the link L1.

The adjacent node information and the linked cost information of the linked record of a linked record number 3 are respectively 5 and 8. The adjacent node of the node N1 is a node N5, and a cost from the node N1 to the node N5 is a cost record number 8. In other words, the cost is represented by the cost record of the link L8.

The regulated record of a regulated record number 0 has entry link information 5, exit link information 3, and inter-link regulated record r10. That is, traffic regulation during traveling from the link L0 corresponding to the linked record number 0 to the link L8 corresponding to the linked record number 3 is r10.

The regulated record of a regulated record number 1 has entry link information 1, exit link information 0 and inter-link regulated record r11. That is, traffic regulation during traveling from the link L11 corresponding to the linked record number 0 to the link L1 corresponding to the linked record number 2 is r11.

The regulated record of a regulated record number 2 has entry link information 2, exit link information 1, and an inter-link regulated code r12. That is, traffic regulation during traveling from the link L1 corresponding to the linked record number 2 to the link L11 corresponding to the linked record number 1 is represented by r12.

The regulated record of a regulated record number 3 has entry link information 3, exit link information 2, and an inter-link regulated code r13. That is, traffic regulation during traveling from the link L8 corresponding to the linked record number 3 to the link L1 corresponding to the linked record number 2 is represented by r13.

FIG. 8 is a view illustrating the content of the cost table of the route calculation data having the data structure shown in each of FIGS. 5A to 5J regarding the road net of FIG. 4A. The cost records of cost record numbers 0 to 15 are allocated to the respective links L0 to L15.

FIGS. 9 to 11 are views respectively illustrating the contents of a node table, connection information and a cost table corresponding to the road net of FIG. 4B.

By deleting the link L12, the number of links connected to the nodes N2 and N3 becomes 3, and the number of inter-link regulations becomes 2. Thus, as shown in the node table of FIG. 9, the number of connected links and the number of regulated records of the node records of the node numbers 2 and 13 are respectively updated to 3 and 2.

By adding the link L16, the number of links connected to the nodes N3 and N14 becomes 4. For regulations among these links, entry regulation r32 form the link L16 to the link L2 and entry regulation r33 from the link L3 to the link L6 are added at the node N3, while previous regulation is maintained at the node N14. Accordingly, as shown in the node table of FIG. 9, the number of connected links and the number of regulated records of the node record of a node record number 3 are respectively updated to 4, and the number of connected links of the node record of a node record number 14 is updated to 4.

In addition, as described below, since the data size of the connected record is changed, the locations of the connected records of connected record number 3, 14, and 15 are changed, and the offsets of the connected records of the node codes of the node record numbers 3, 14, and 15 are respectively updated to JOFS3', JOFS14', and JOFS15'.

In the connection information of FIG. 10, by deleting the link L12, in the connected record of a connected record number 2, the linked record of a linked record number 1 corresponding to the link L12 of the connected record number 2 of FIG. 7 is deleted, and the linked records of linked record number 0, 2, and 3 are disposed. The regulated records of regulated record numbers 1 and 2 indicating regulations regarding the link L12 in the connected record of the connected record number 2 of FIG. 7 are deleted, and the regulated records of regulated record numbers 1 and 2 are disposed. As described later, since the link cost record number is changed by deleting the link L12, the link cost information of the linked record number 1 is updated to 12.

As in the case of the connected record of the connected record number 13, because of the change of the link cost record number, Bits of link cost information of the linked record of the link record number 0 of the connected record numbers 8 to 10 are respectively updated to 12, 13 and 14; bits of link cost information of the linked record of the linked record number 1 of the connected record numbers 12 and 14 respectively to 12 and 14.

By adding the link L16, in the connected record of the connected record number 3, the linked record of the linked record number 3 corresponding to the link L16 is added, and regulated record numbers 1 and 2 indicating regulations regarding the link L16 are inserted before the regulated record of the regulated record number 1 of the connected record of the connected record number 3 shown in FIG. 7. In the connected record of the connected record number 14, the linked record of the linked record number 3 corresponding to the link L16 is added.

In addition, because of the deletion of the link L12 and the addition of the link L16, as described above, the addition and deletion of linked records and regulated records occur, causing changes in the data sizes of the connected records of the connected record numbers 2, 3, 13 and 14. Thus, the offsets of the connected records of the connected record number 3, 14, and 15 are respectively changed to JOFS3', JOFS14', and JOFS15', and the data size of the connection information is also changed. Following the change in the data size of the connection information, the offset of the cost table arranged after the connection information is also changed.

In the node N12, the content of the traffic regulation regarding the entry from the link L11 to L5 is updated from r63 to r63'.

In the cost table of FIG. 11, by deleting the link L12, the cost record of a cost record number 12 of FIG. 8 corresponding to the link L12 is deleted, and the cost record numbers of the cost records thereafter are changed. In addition, by adding the link L16, the cost record of a cost record number 12 is added.

As described above, with respect to the updating, i.e., the deletion of the link L12 and the deletion of the link L16, the followings are carried out: record updating of the node record numbers 2, 3, 13, 14 and 15 of the node table; connected record updating of the connected record numbers 2, 3, 8, 9, 10, 12, 13 and 14 of the connection information; deletion of the cost record of the costs record number 12 of the cost table; and addition of the cost record to the end.

Thus, updated map data can be represented by the collection of updating operation information regarding the records of various data. At the map data providing station having the processor of a high processing capability, the updated map data is converted into updating operation information of the records of various data. In the map data processing apparatus, by updating the map data according the updating operation information of the records, a load placed for updating on the map processing apparatus can bee greatly reduced, and updating can be quickly carried out.

Next, an operation will be described.

Figure 12:
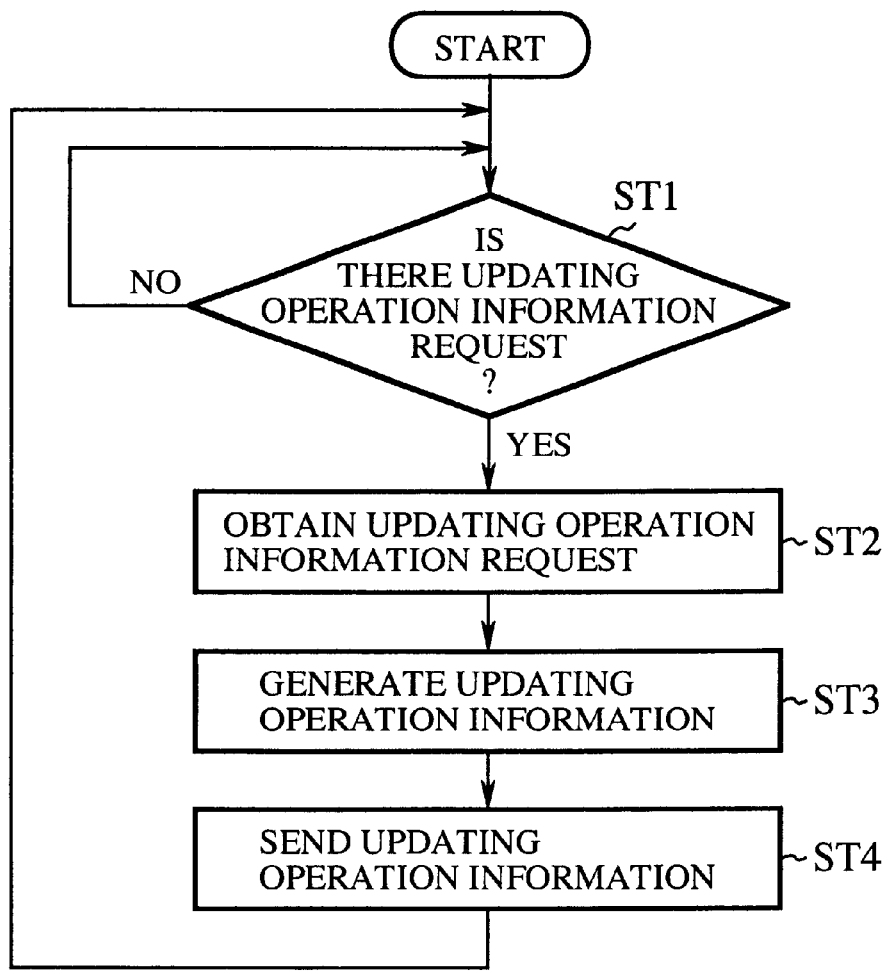
FIG. 12 is a flowchart showing an operation of the map data providing station.

FIG. 12 is a flowchart showing the operation of the map data providing station. When the map data providing station is actuated, in step ST1, the process stands by for the arrival of an updating operation information request sent from the transmitter/receiver 14 of the map data processing apparatus to the transmitter/receiver 21, and proceeds to step ST2 after the arrival.

In step ST2, the updating operation information request is obtained from the transmitter/receiver 21. This updating operation information request contains map data identification information indicating the map data of an area, and version information, which are necessary for the navigation processing of the map information processing apparatus.

In step ST3, according to the map data identification information indicating map data ID M, and the version information indicating a version V, obtained in step ST2, the updating operation information generator 24 generates updating operation information by referring to the map data having map data ID M, stored in the road net database 23, and road net update data from the version V to a latest version VX regarding the map data of map data ID M stored in the road net update database 23.

In step ST4, the updating operation information generated in step ST3 is transmitted to the transmitter/receiver 3 of the map data processing apparatus by the transmitter/receiver 21.

Then, the process proceeds to step ST1, where processing similar to the above is repeated.

Taking the example of the route calculation data of FIGS. 5A–5C, the updating operation information generated in step ST3 is now described. For example, it is assumed that when the map data ID M indicates the map data of an area shown in each of FIGS. 4A and 4B, the version V corresponds to the road net of FIG. 4A, and the road net of the latest version VX is a road of FIG. 4B.

In this case, road net update data from the version V to the latest version regarding the map data of the map data ID M store in the road net update database 23 contains bits of information indicating the deletion of the link L12, the addition of the link L16, and various bits of information regarding the link L16 in each of FIGS. 4A and 4B.

The updating operation information generator 24 generates information regarding how to update the records constituting various data necessary for updating from the route calculation data of FIGS. 6 to 8 to the route calculation data of FIGS. 9 to 11, by deleting the link L12 and adding the link L16 shown in each of FIGS. 4A and 4B according to the above-described road net update data. In addition, since the data sizes of various data constituting the route calculation data are also changed, information is generated regarding how to update the route calculation header of FIGS. 5A–5J.

Figure 13A:
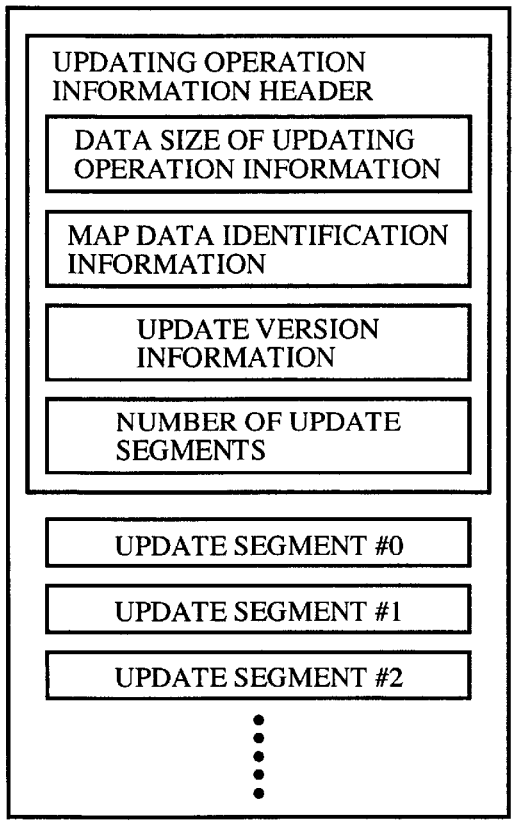
FIGS. 13A to 13D are views, each showing an example of a data structure of updating operation information.

FIGS. 13A to 13D are views, each showing an example of the data structure of updating operation information generated in the above-described manner by the updating operation information generator 24. As shown in FIG. 13A, updating operation information is composed of an updating operation information header and one or a plurality of update segments. The updating operation information contains an updating operation information data size indicating the data size of the updating operation information, map data identification information indicating the map data ID of the map data, update version information indicating an update version indicated by the updating operation information, i.e., from which version to which version the updating is made, and an update segment number indicating the number of update segments of the updating operation information.

If the latest map data has already been supplied to the map data processing apparatus that made the updating operation information request, in other words, if the version information in the updating operation information request coincides with the latest version, the updating operation information is set as one regarding updating from the latest version to the latest version, the number of update segments is set to 0, and the update information is composed of only the updating operation information header.

Figure 13B:
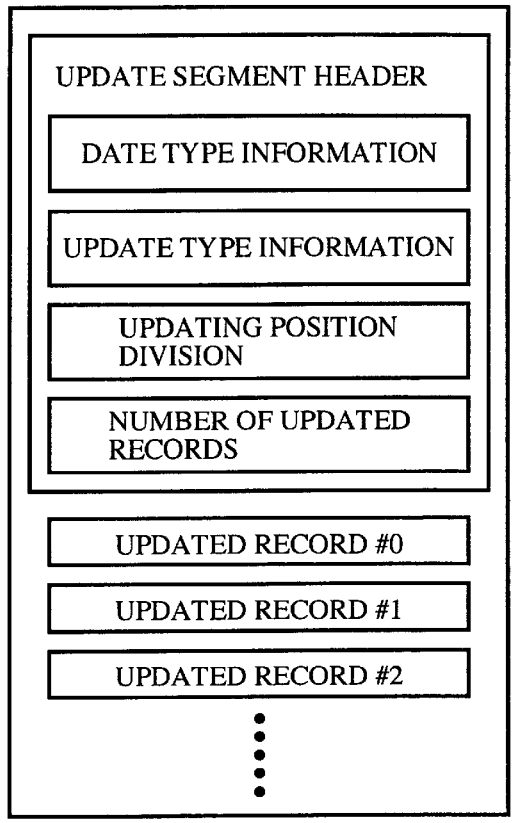

As shown in FIG. 13B, the update segment is composed of an update segment header, and one or a plurality of update records. The update segment header includes data type information, update type information, an updating position division, and the number of update records. The data type information is defined like that shown in FIG. 14A, indicating the kind of data to be updated by the update segment, i.e., one selected from the route calculation header, the node table, the connection information, the cost table, and so on. The update type information is defined like that shown in FIG. 14B, indicating an updating operation to be performed, i.e., one selected from deletion, addition and overwriting. The updating position division is defined like that shown in FIG. 14C, indicating whether the specification of an updating position is an offset type using the data size of data stored from the head of data specified by the data type information to the updating position, or a record type using the record number of the data specified by the data type information. The number of update records indicates the number of update records of the update segment.

In the case of the record type of the updating position division, a fixed length record type or a variable length record type is shown depending on whether the data specified by the data type information has a fixed length or a variable length.

Figure 13C:
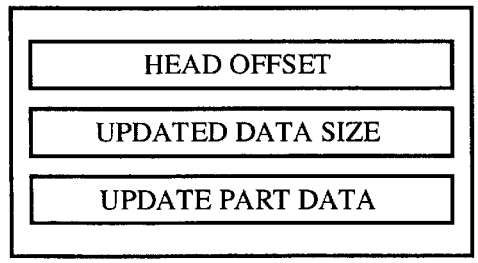

FIG. 13C shows the data structure of the update record when the updating position division is the offset type. A head offset indicates the head position of performing an updating operation, specified by the update type information, by an offset from the head of the data indicated by the data type information before updating. The update data size indicates the range of performing the updating operation specified by the update type information. The number of update part data present is equal to an amount indicated by the update data, indicating data for substitution, and addition. When the update type information indicates deletion, there are no update part data.

In the case of the update record of the offset type, when the update type information indicates deletion, data indicated only by the update data size is deleted from the position indicated by the head offset of the data indicated by the data type information. When the update type information indicates substitution, data indicated only by the update data size is substituted by update part data from the position indicated by the head offset of the data indicated by the data type information. When the update type information indicates addition, update part data is inserted into the position indicated by the head offset of the data indicated by the data type information.

Figure 13D:
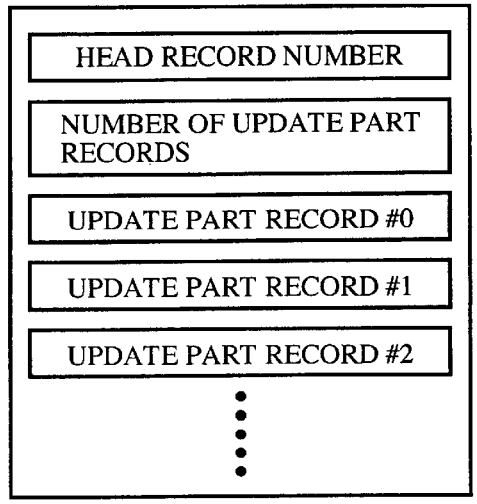

FIG. 13D shows the data structure of the update record when the updating position division is a fixed length or variable length record type. A head record number indicates the head position of performing an updating operation, specified by the update type information, by the record number of data indicated by the data type information before updating. The number of update part records indicates the range of performing the updating operation specified by the update type information from the head record number. The number of update part records present is equal to that indicated by the update part record number, indicating data for substitution, and addition. When the update type information indicates deletion, there are no update part data.

In the case of the update record of the record type, when the update type information indicates deletion, the number of records indicated by the number of update records is deleted from a position indicated by the head record number of data indicated by the data type information. When the update type information indicates substitution, the number of records indicated by the number of update records is substituted by update part records from the position indicated by the head record number of the data indicated by the data type information. When the update type information indicates addition, an update part record is inserted before the record indicated by the head record number of the data indicated by the data type information. If a record is added to the end of data specified by the data type information, a value obtained by adding 1 to the record number of the end record of the data is set as a head record number.

The update segments of FIG. 13B are continuously disposed if data type information is identical. If the data type information is identical, then in the updating position division, the offset type is disposed before the record type. If the data type information and the updating position division are identical, bits of update type information are disposed in the order of substitution, deletion and addition.

FIG. 15 shows the updating operation information of the data structure shown in each of FIGS. 13A to 13D, generated by the updating operation information generator 24. An updating operation from the route calculation data of FIGS. 6 to 8 to that of FIGS. 9 to 11 is instructed, and an update segment #0 indicates that an offset from the head of the route calculation header is data of 12 to 8 bytes, in other words, instruction is made to substitute the data size of the connection information, and the offset of the cost table by update data SSSS, and OOOO.

An update segment #1 indicates that substitution is carried out according to the update records #0 and #1 of the node records of the node table is instructed. For example, the update record #0 instructs two node records from the node record number 2, i.e., the node records of the node record numbers 2 and 3, to be substituted by the node records of the node record numbers 2 and 3 of FIG. 9.

An update segment #2 indicates that substitution is carried out according to the update records #0 and #1 of the connected records of the connection information. For example, the update record #0 instructs two connected records from the connected record number 2, i.e., the connected records of the connected record numbers 2 and 3, to be substituted by the connected records of the connected record numbers 2 and 3 of FIG. 10.

An update segment #4 indicates that addition is made to the connection information according to the update records #0 and #1. For example, the update record #0 instructs the two connected records of the connected record numbers 2 and 3 of FIG. 10 to be added before the connected record number 4.

An update segment #3 indicates that deletion is carried out from the connection information according to the update records #0 and #1. For example, the update record #0 instructs two connected records from the connected record number 2, i.e., the connected records of the connected record numbers 2 and 3, to be deleted.

An update segment #5 indicates the deletion of a cost record from the cost table. The update record #0 instructs one cost record from the cost record number 12, i.e., the cost record of the cost record number 12, to be deleted.

An update segment #6 indicates the addition of a cost record to the cost table. The update record #0 instructs one node record of the costs record number 15 of FIG. 11 to be added before the cost record number 16, i.e., after the cost record number 15.

Figure 16:
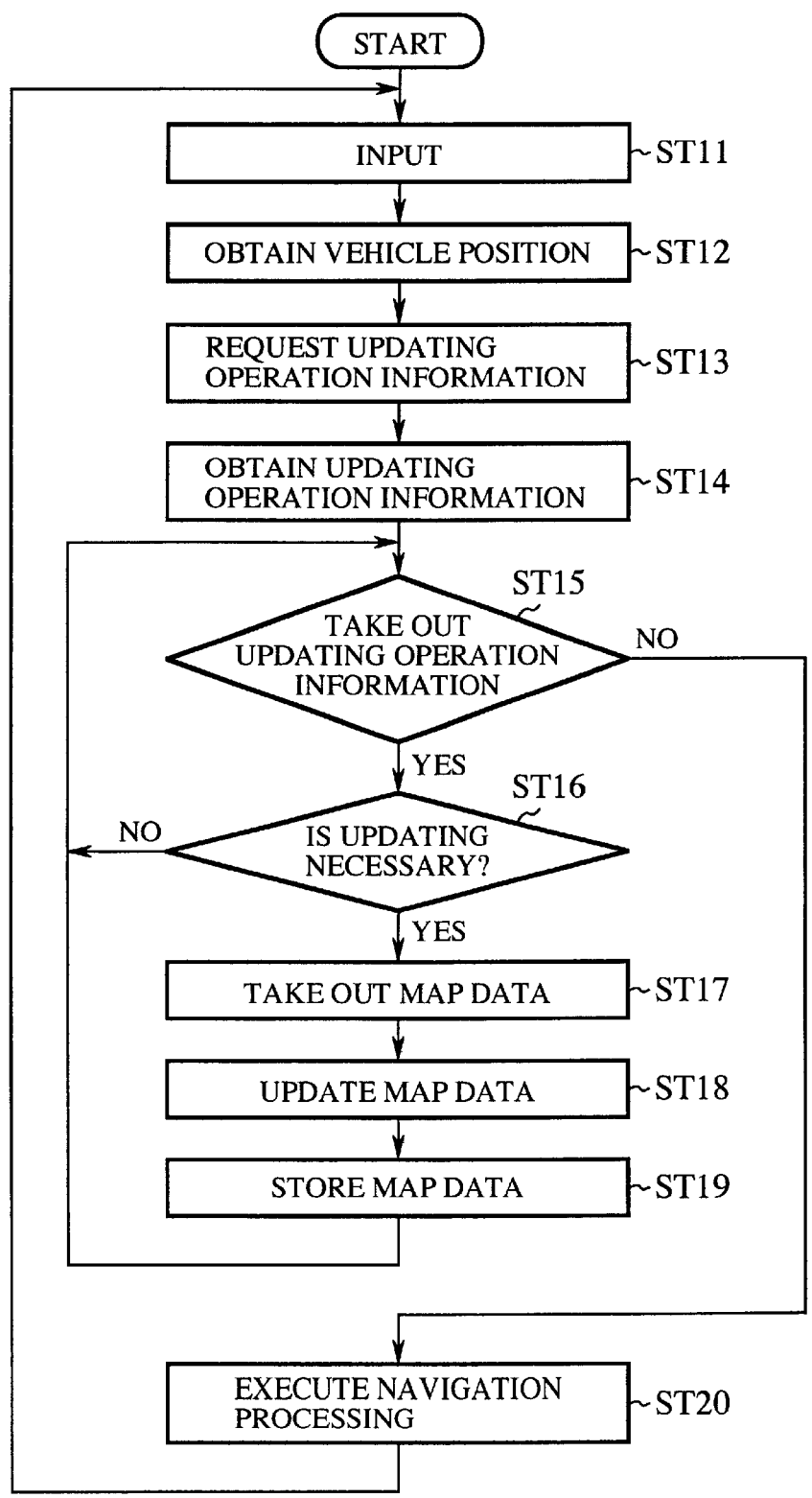
FIG. 16 is a flowchart showing an operation of the map data processing apparatus.

FIG. 16 is a flowchart showing the operation of the map data processing apparatus. When the apparatus is actuated, first, in step ST11, operation information is entered from the input device 11 to operate the map data processing apparatus, the information regarding the reduced scale displaying of the map, scrolling of the displayed map, selection of a destination, route calculation, or the like.

In step ST12, the current position of a vehicle is obtained by the vehicle position detector 12.

In step ST13, map data of an area necessary for navigation processing is decided from the operation information obtained in step ST11, the current position of the vehicle obtained in step ST12, and so on. Then, an updating operation information request containing map data identification information and version information, representing the map data, is transmitted by the transmitter/receiver 14 to the map data providing station, and a request is made to transmit updating operation information for updating the map data to latest map data.

In step ST14, the updating operation information transmitted from the map data providing station is received by the transmitter/receiver 14 according to the updating operation information request of step ST13.

In step ST15, the updating operation information received in step ST14 is taken out bit by bit by the transmitter/ receiver 14 each time the process comes this step, and then the process proceeds to step ST16. However, if all bits of updating operation information have been taken out, and there are no more bits of updating operation information, then the process proceeds to step ST20.

In step ST16, reference is made to the updating operation information header of the updating operation information obtained in step ST15 and, if the number of update segments is 0, it is determined that the updating of the map data is unnecessary. The process then proceeds to step ST17.

In step ST17, reference is made to the updating operation information header of the updating operation information obtained in step ST15, and the map data indicated by the map data identification information is taken out from the map data storage device 13.

In step ST18, updating is executed for the map data obtained in step ST17 according to the updating operation information obtained in step ST15.

In step ST19, the map data updated in step ST18 is stored in the update data storage device 16, and management information stored in the update data storage device 16 is also updated. If the storage capacity of update data storage device 16 is exceeded by storing the map data, the map data stored in the update data storage device 16 is deleted from the one of oldest storage time until a required vacant area can be secured, and the map data is stored.

In step ST20, reference is made to the management information of the update data storage device 16, necessary map data is obtained from the update data storage device 16. If the necessary map data is not present in the update data storage device 16, necessary map data is obtained from the map data storage device 13 by referring to the management information of the map data storage device 13, and then predetermined navigation processing is carried out.

Then, the process returns to step ST11, and the above-described processing is executed, thereafter.

FIG. 17 is a flowchart showing the detail of step ST18. In step ST21, a segment specifying value for specifying an update segment to be processed is set to 0, i.e., a head update segment. For segment specification, one of the update segments in the updating operation information obtained in step ST15 is specified based on its number of the arraying order.

In step ST22, the number of update segments among the update segments in the updating operation information header of the updating operation information obtained in step ST15 is compared with the segment specifying value. If coincidence is determined, then the processing of step ST18 is finished understanding that all the update segments of the updating operation information have been processed. If non-coincidence is determined, the process proceeds to step ST23 to process an update segment indicated by segment specification.

In step ST23, an updated record specifying value for specifying an updated record to be processed is set to 0, i.e., a head updated record. For the updated record specification, one of the updated records in the update segment indicated by the segment specification is specified based on its number in the arraying order.

In step ST24, the number of updated records in the update segment header of the update segment indicated by the segment specification is compared with the updated record specifying value. If coincidence is determined, the process proceeds to step ST30 understanding that all the updated records of the update segment indicated by the segment specification have been processed. If non-coincidence is determined, then the process proceeds to step ST25 to process the updated record indicated by the updated record specification.

In step ST25, checking is made on the update type information of the update segment header of the update segment indicated by the segment specification. If the information indicates deletion, the process proceeds to step ST26. If addition, the process proceeds to step ST27. If substitution, the process proceeds to step ST28.

In steps ST26, ST27, and ST28, reference is made to the update segment header of the update segment indicated by the segment specification, deletion, addition and substitution are executed for the data indicated by the data type information of the update segment header in the map data obtained in step ST17, according to the updating position division of the update segment header, and the updated record indicated by the updated record specification. Then, the process proceeds to step ST29.

In step ST29, the updated record specifying value is increased only by 1 to specify the updated record disposed next. Then, the process proceeds to step ST24.

Thereafter, the process from step ST24 to step ST30 is repeated and, when the processing of all the updated records of the update segment indicated by the segment specification is completed, the process proceeds from step ST24 to step ST30 as described above.

In step ST30, the segment specifying value is increased only by 1 to specify the update segment disposed next. Then, the process proceeds to step ST21.

Thereafter, the above-described processing is repeated, and all the update segments in the updating operation information obtained in step ST15 are processed. Then, the processing of step ST18 is finished.

As described above, the map data is updated by performing simple processing, e.g., data substitution, deletion and addition, according to the instruction of the updating operation information. Thus, quick updating is carried out.

Embodiment 2

Figure 24:
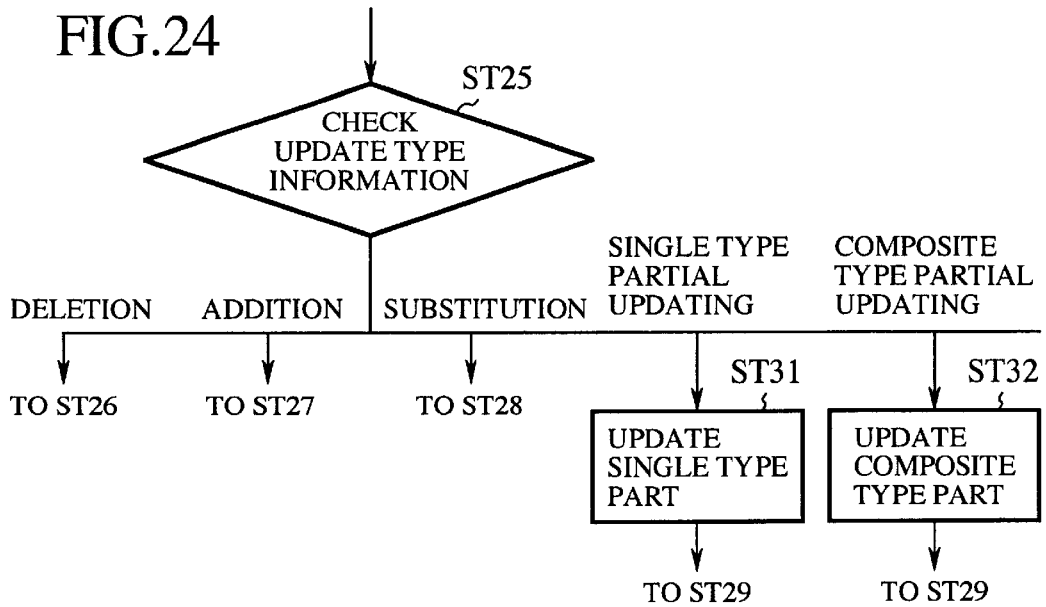
FIG. 24 is a flowchart showing an operation of a map data processor.

According to the second embodiment, update type information in the updating operation information shown in each of FIGS. 13A to 13D is defined like that shown in FIG. 18. The data structure of the updated record in the updating operation information of each of FIGS. 13A to 13D is set to be like that shown in each of FIGS. 19A to 19C when the update type information indicates single type partial updating, or like that shown in each of FIGS. 20A to 20C when the update type information indicates composite type partial updating. For the processing of step ST25 of FIG. 17, as shown in FIG. 24, checking when the update type information indicates single type partial updating, and checking when the update type information indicates composite type partial updating are added. In the case of the single type partial updating, the processing of step ST31 is executed. In the case of the composite type partial updating, the processing of step ST32 is executed. Thus, partial updating in the record can be carried out.

Figure 19A:
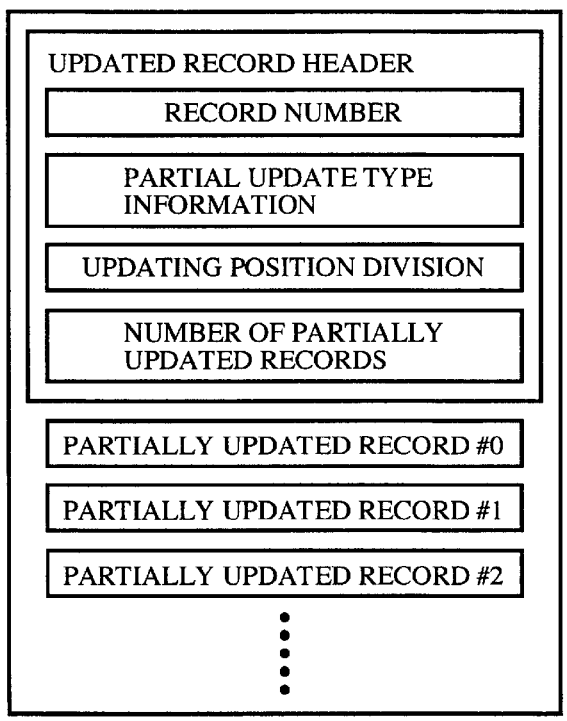
FIGS. 19A to 19C are views, each illustrating a data structure of an update record when update type information indicates single type partial updating.

FIG. 19A shows the data structure of the updated record, which is composed of an updated record header, and one or a plurality of partial updated records. The updated record header includes a record number indicating a record to be updated, of data indicated by data type information, partial update type information, an updating position division, a partial updated record number indicating the number of partial updated records. The partial update type information and the updating position division are defined respectively like those of FIGS. 14B and 14C.

Figure 19C:
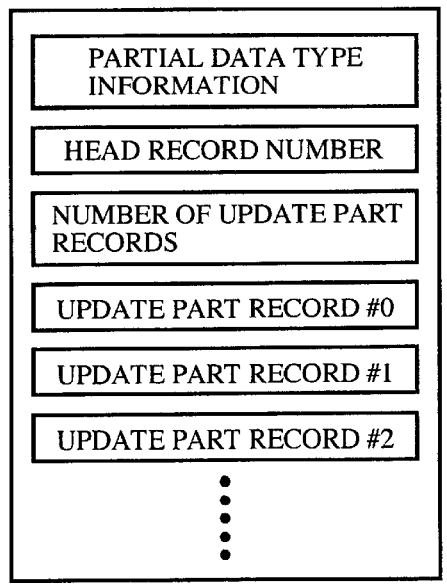
Figure 19B:
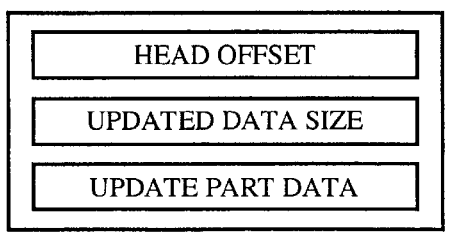

FIG. 19B shows the data structure of a partial updated record when the updating position division is an offset type. A head offset indicates the head position of executing an updating operation, indicated by the partial update type information of the updated record header, by an offset from the head of a record indicated by the record number of the updated record header. An update data size indicates the range of executing the updating operation specified by the partial update type information of the head offset. The number of update part data present is equal to an amount indicated by the update data size, indicating data for substitution and addition. When the partial update type information indicates deletion, no update part data are present.

FIG. 19C shows the data structure of a partial updated record when the updating position division is a record type. Partial data type information indicates the kind of data to be updated in the record to be updated, of the updated records. A head record number indicates the head position of executing an updating operation specified by the partial update type information by the record number of data indicated by the partial data type information before updating. The number of update part records indicates the range of executing the updating operation specified by the partial update type information from a head record number. The number of update part records present is equal to the number of update part records, indicating data for substitution and addition. No update part data are present when the partial update type information indicates deletion.

By the above-described updated records, the updating operation of the same kind can be instructed for one or a plurality of places in the record.

FIGS. 20A to 20C are views, each showing a case where the partial update type information and the updating position division in the updated record header in each of FIGS. 19A to 19C are held for each partial updated record, and the updating operations of different kinds can be instructed in one record.

As described above, by setting the updated records like those shown in each of FIGS. 19A to 19C and FIGS. 20A to 20C, a plurality of updating operations can be specified for one record by one partial updated record. Thus, the data size of the updating operation information can be reduced.

FIG. 21 shows a definition example of partial data type information in the connected record of the connection information of the route calculation data of FIGS. 5A–5J. 0 and 1 are respectively allocated to the array of the linked records and the array of the regulated records constituting the connected record.

FIGS. 22A and 22B are views showing the examples of updated records having the data structures of FIGS. 19A to 19C when the node record of the node record number 15 of the node table is updated from that of FIG. 6 to that of FIG. 9, and when the connected record of the connected record number 12 of the connection information is updated from that of FIG. 7 to that of FIG. 10. A partial data type is defined like that shown in each of FIGS. 19A to 19C.

In FIGS. 22A and 22B, FIG. 22A shows the example of an updated record indicating the single type partial updating of the node record of the node table. Specifically, from a position where an offset from the head of the node record of the node record number 15 of FIG. 6 is 10, 2 bytes are instructed to be substituted by update part data JOFS15'.

It is assumed that the offset of the connected record of the node record is 10, and its data length is 2 bytes.

FIG. 22B shows the example of an updated record indicating the single type partial updating of the connected record of connected information. Regarding the connected record of the connected record number 12 of FIG. 7, the partial updated record #0 instructs the record of a linked record number 1 to be substituted by the update part record #0, i.e., the content of a linked record where the linked record number of connected record of the connected record number 12 of FIG. 10 is 1. The partial updated record #1 instructs the record of a regulated record number 3 to be substituted by the update part record #0, i.e., a regulated record where the regulated record number of the connected record of the connected record number 12 of FIG. 10 is 3.

FIG. 23 shows the example of an updated record indicating the composite type partial updating of the connected record of the connection information. Regarding the connected record of the connected record number 14 of FIG. 7, the partial updated record #0 instructs the record of a linked record number 1 to be substituted by the updated part record #0, i.e., the content of a linked record where the linked record number of the connected record of the connected record number 14 of FIG. 10 is 1. The partial updated record #1 instructs the updated part record #0 to be added to the end of the linked record array of the connected record of the connected record number 14 of FIG. 7, i.e., a linked record where the linked record number of the connected record of the connected record number 14 of FIG. 10 is 3.

Figure 25:
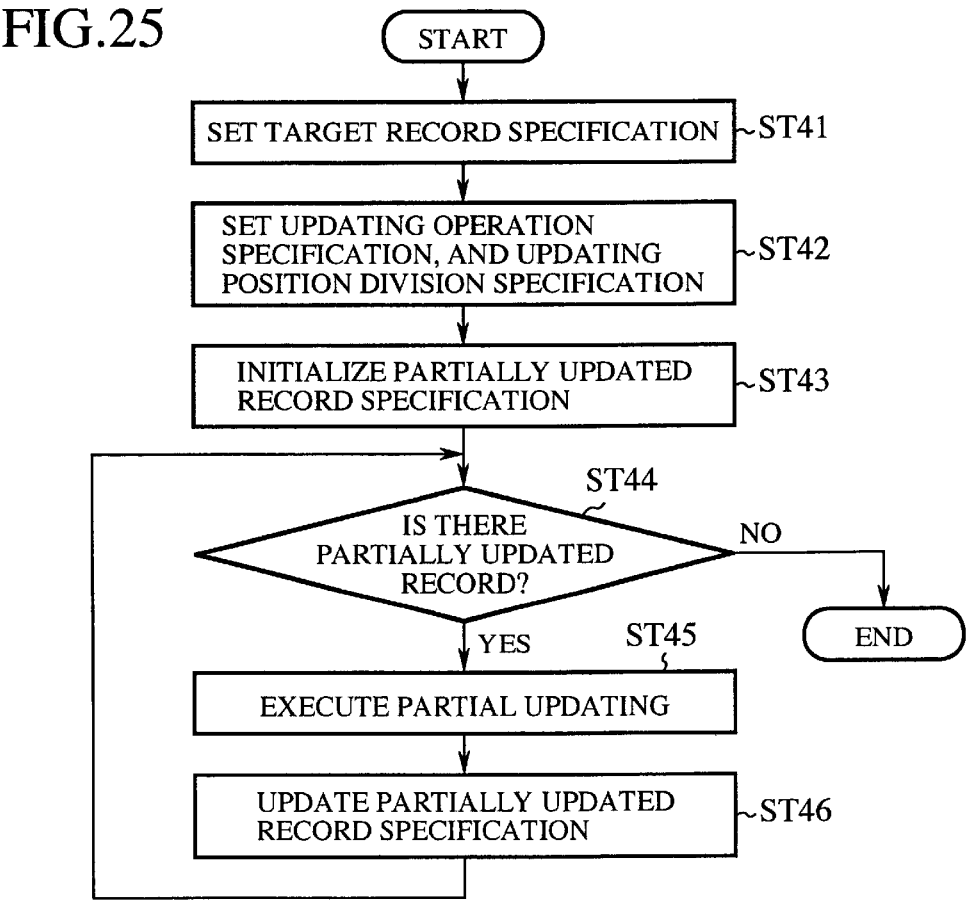
FIG. 25 is a flowchart showing in detail single type partial updating of step ST31 of FIG. 24.

FIG. 25 is a flowchart showing in detail the single type partial updating of step ST31 of FIG. 24.

In FIG. 25, in step ST41, target record specification indicating a record to be updated is set equal to the value of the record number of the updated record header of each of FIGS. 19A to 19C.

In step ST42, updating operation specification and updating position division specification for specifying an updating operation and an updating position division are set equal to values specified by the partial update type information and the updating position division of the updated record header of FIGS. 19A to 19C.

In step ST43, for a partial updated record to be processed, a partial updated record specifying value specified based on the arraying order of the updated records is set to be 0, i.e., a head partial updated record.

In step ST44, the number of partial updated records in the update record header is compared with the partial updated specifying value, If coincidence is determined, the processing of step ST31 is finished understanding that the processing of all the partial updated records of the updated record has been completed. If non-coincidence is determined, the process proceeds to step ST45 to process the partial updated record indicated by partial updated record specification.

In step ST45, according to the partial updated record indicated by the partial updated record specification, a record indicated by target record specification is updated based on the updating operation and the updating position division specified in step ST42.

In step ST46, the updated record specifying value is increased only by 1, an updated record disposed next is specified, and the process proceeds to step ST44.

Thereafter, the process from step ST44 to step ST46 is repeated. When the processing of all the partial updated records is completed, the processing of step ST31 is finished.

Figure 26:
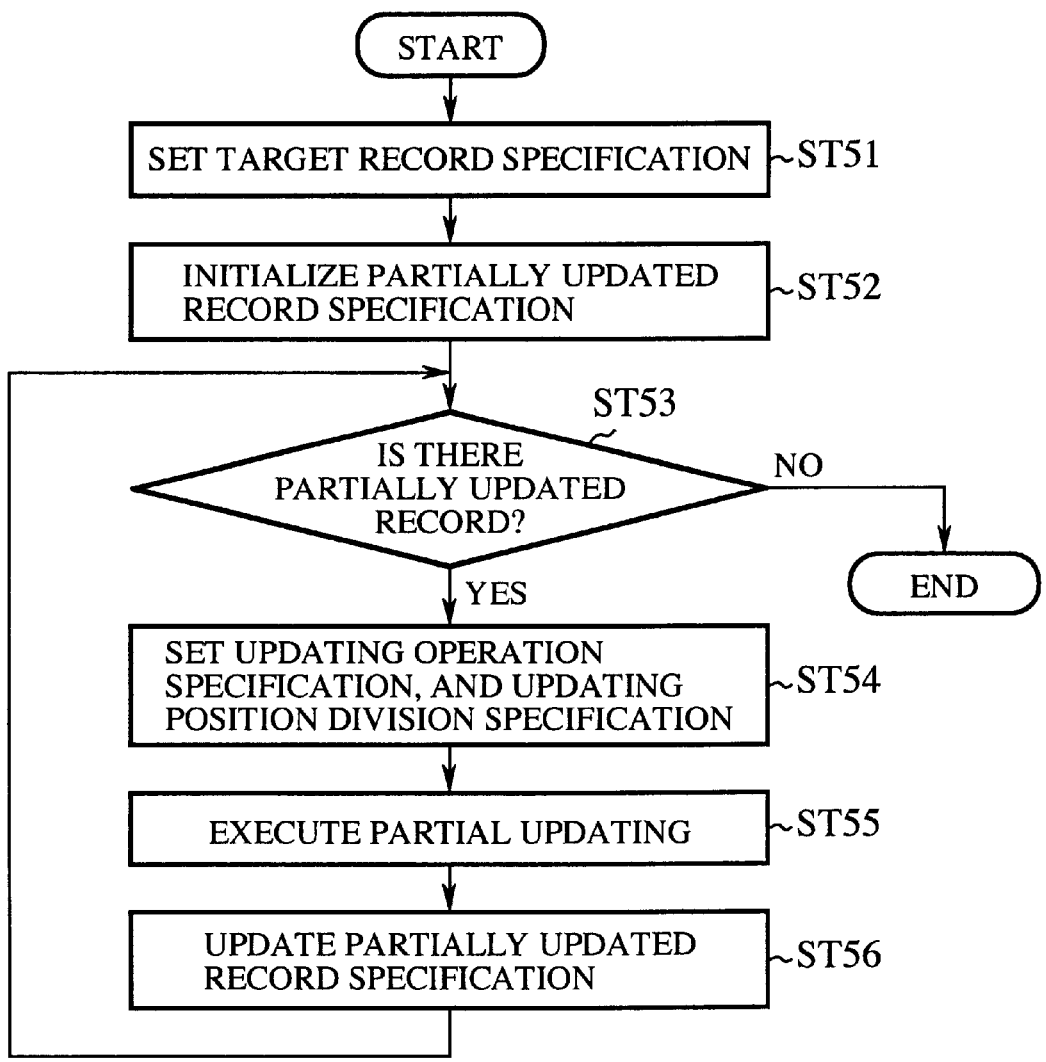
FIG. 26 is a flowchart showing in detail composite type partial updating of step ST32 of FIG. 24.

FIG. 26 is a flowchart showing in detail the composite type partial updating of step ST32 in FIG. 24.

In FIG. 26, in step ST51, target record specification indicating a record to be updated is set equal to the value of the record number of the updated record header of FIGS. 20A to 20C.

In step ST52, for the partial updated record to be processed, the partial updated record specifying value specified based on the arraying order of the updated records is set equal to 0, i.e., a head partial updated record.

In step ST53, the number of partial updated records in the updated record header is compared with the partial updated record specifying value. If coincidence is determined, the processing of step ST32 is finished understanding that the processing of all the partial updated records of the updated record has been completed. If non-coincidence is determined, the process proceeds to step ST54 to process the partial updated record indicated by partial updated record specification.

In step ST54, updating operation specification and updating position division specification for specifying an updating operation and an updating position division are set equal to values specified in the partial update type information and the updating position division of the updated record header of FIGS. 20A to 20C of the partial updated record indicated by the partial updated record specification.

In step ST55, the record indicated by the target record specification is updated according to the partial updated record indicated by the partial updated record specification.

In step ST56, the updated record specifying value is increased only by 1, and the updated record disposed next is specified. Then, the process proceeds to step ST422.

Thereafter, the process from step ST53 to step ST56 is repeated. When the processing of all the partial updated records is completed, the processing of step ST32 is finished.

As described above, the updating of a plurality of identical update types in the record is achieved as one partial updated record, and the updating of a plurality of different update types in the record is achieved as one partial updated record. Thus, time required to obtain updating operation information from the map data providing station can be shortened, map data updating can be quickly carried out, and communications costs can be reduced.

Embodiment 3

Figure 27:
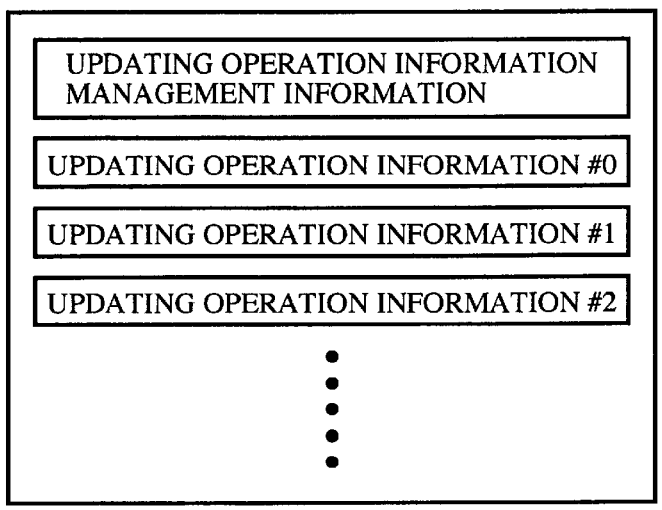
FIG. 27 is a view illustrating a data structure of an updating operation information storage section.

FIG. 27 shows the data structure of an updating operation information storage section provided in the updated data storage device 16 according to the third embodiment. Updating operation information is stored according to updating operation information management information. The updating operation information management information shows the location of the updating operation information stored in the updated data storage device 16.

Figure 28:
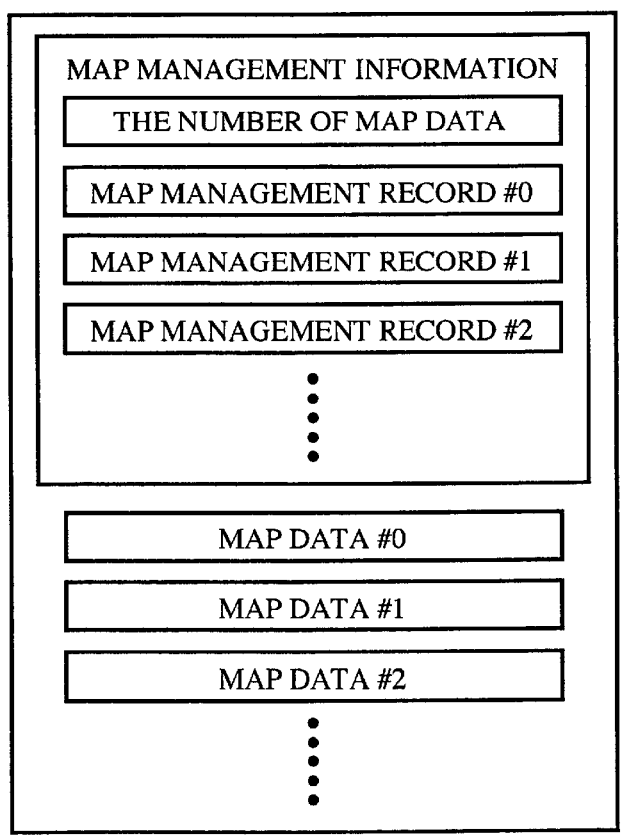
FIG. 28 is a view illustrating a data structure of a map buffer.

FIG. 28 shows the data structure of a map buffer provided in the map data processor 15 according to the third embodiment. The map buffer stores map data according to map management information. The map management information is composed of a map data number indicating the number of map data necessary for navigation processing, and map management records provided corresponding to the map data necessary for navigation processing. The map management record contains map date identification information indicating the map data ID of the corresponding map data, map data presence information indicating presence of the corresponding map data in the map buffer, and map data position information indicating the location of the corresponding map data in the map buffer.

Figure 29:
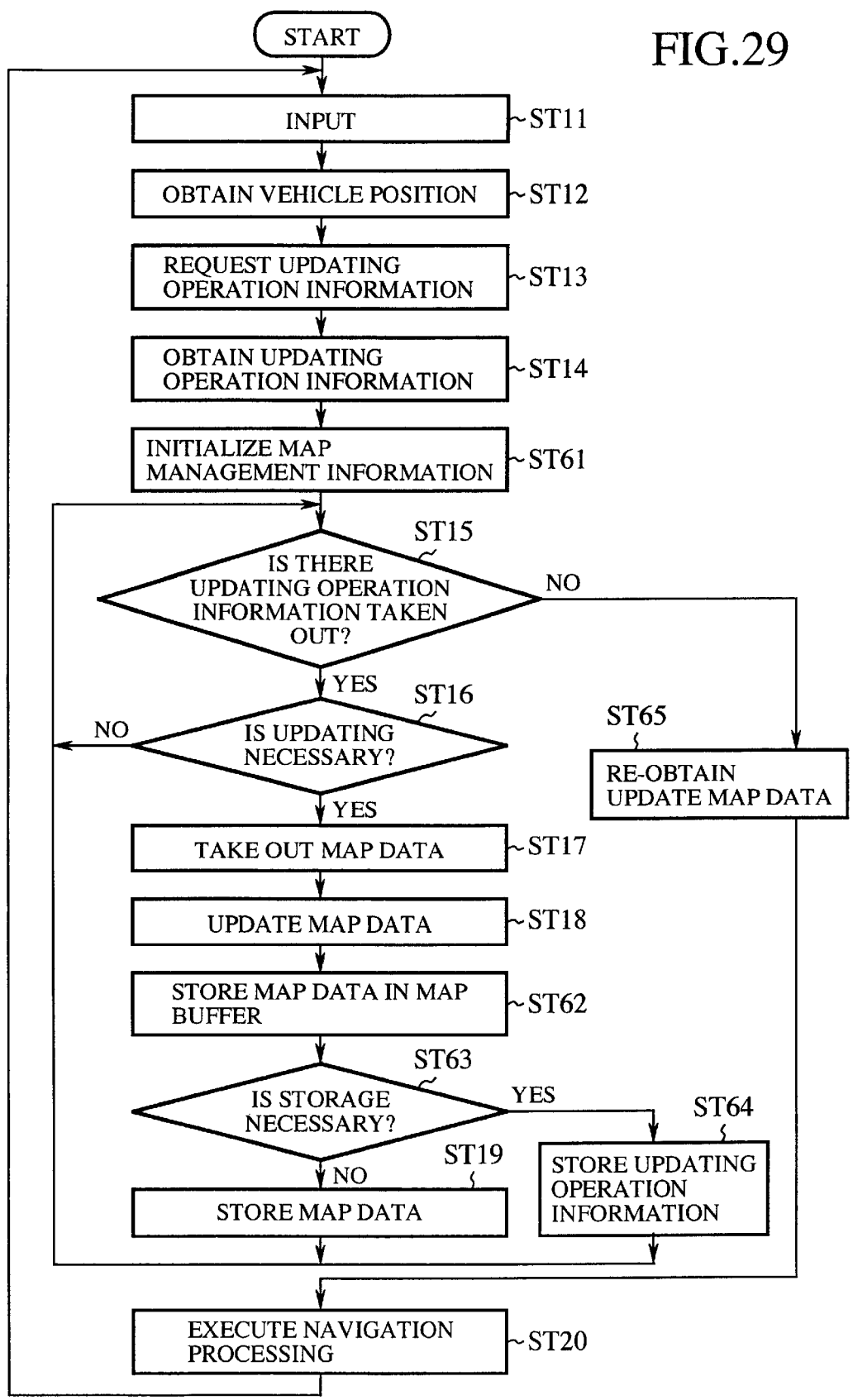
FIG. 29 is a flowchart showing an operation of a map data processing apparatus according to the third embodiment.

FIG. 29 is a flowchart showing the operation of the map data processing apparatus of the third embodiment, where steps ST61 to ST65 are added to the process of FIG. 16. In step ST18, time expended for updating is measured.

In step ST61, the map management information of the map buffer of the map data processor 15 is subjected to initialization. In the number of map data, the number of mal data necessary for the navigation processing of step ST20 is set. The map data ID of each map data necessary for the navigation processing of step ST20 is set in each map data identification information. Each map data presence information is set to be non-present.

In step ST62, the map data updated in step ST18 is stored in the map buffer of the map data processor 15. The map data presence information of a map management record corresponding to the stored map data is set to be present. The location of the map data is set in the map data position information.

In step ST63, the necessity of storing the updating operation information obtained in step ST15 is determined. If the time expended for the updating of step ST18 is equal to a predetermined value or higher, the process proceeds to step ST63 determining that the storage is necessary. If not, the process proceeds to step ST19 determining that the storage is unnecessary.

In step ST64, according to the updating operation information management information of the updated data storage device 16, the updating operation information obtained in step ST15 is stored in the updated data storage device 16, and the updating operation information management information is updated. In this case, the updating operation information stored in updated data storage device 16 is referred to as already obtained updating operation information. When the storage capacity of the updating data storage device 16 is exceeded by storing the updating operation information, the updating operation information stored in the updated data storage device 16 is deleted from the one of the oldest storage time until a required vacant ar3ea is secured, and the updating operation information is stored.

In addition, the map data stored in the updating data storage device 16 in step ST19 is referred to as already updated map data.

Figure 30:
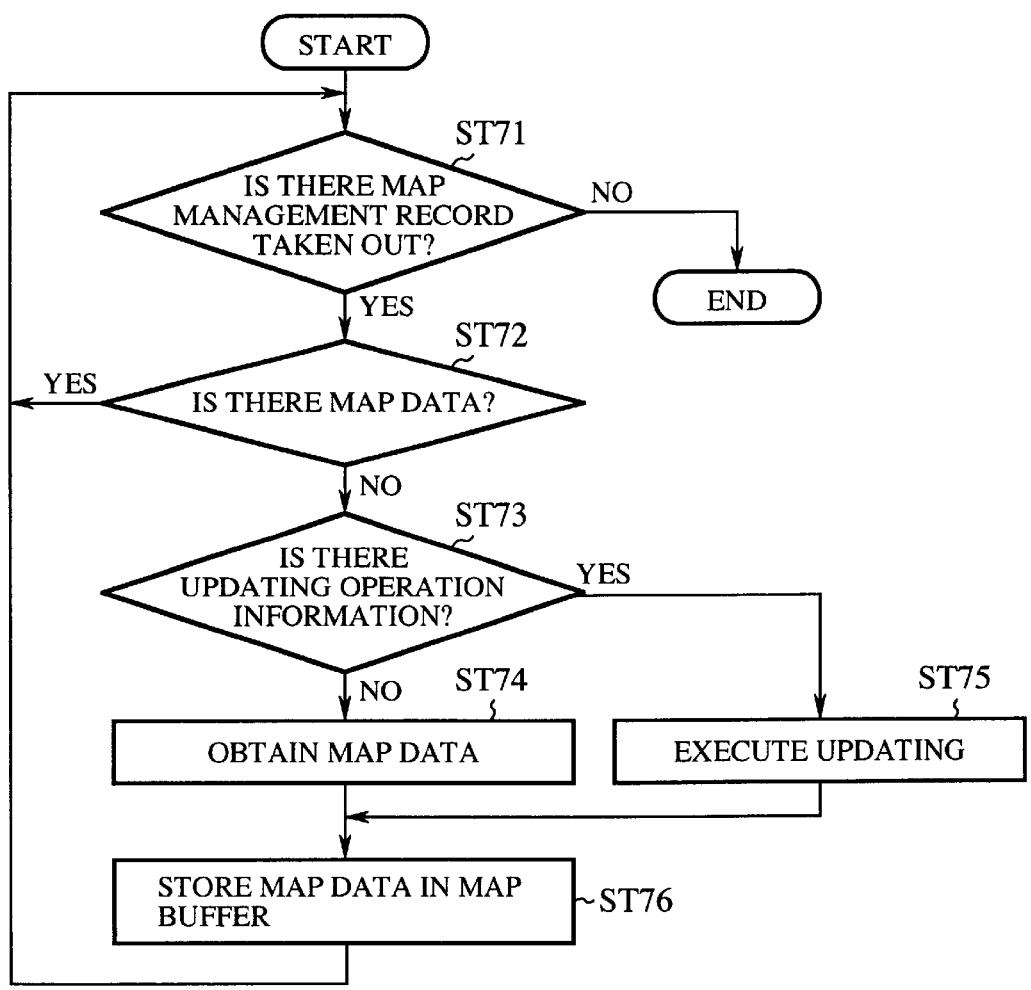
FIG. 30 is a flowchart showing an operation of a map data processor.

In step ST65, the process shown in the flowchart of FIG. 30 is carried out. For the map data not stored in the map buffer of the map data processor 15 among the map data necessary for the navigation processing of step ST20, its already obtained updating operation information or the already updated map data has been stored in the updated data storage device 16 by the updating operation request previously made. In this step, the map data updated by the already obtained updating operation information or the already updated map data is stored in the map buffer of the map data processor 15. This processing is referred to as updated map data re-obtaining.

In step ST20, predetermined navigation processing is carried out by referring to the map data stored in the map buffer of map data processor 15.

In FIG. 30, in step ST71, the map management record of the map management information of the map buffer of the map data processor 15 is taken out. The map management information is successively taken out bit by bit in the arraying order thereof each time the process comes to this step, and then the process proceeds to step ST27. When there are no more map management records to be taken out, the processing of step ST20 is finished.

In step ST72, if the map data presence information of the map management record taken out in step ST71 indicates non-presence, then the process proceeds to step ST73 determining that for the map data, the already obtained updating operation information or the already updated map data has been stored in the updated data storage device 16 by the updating operation information request previously made. If presence is indicated, the process proceeds to step ST71 determining that the map data of a latest version has been stored in the map buffer of the map data processor 15.

In step ST73, investigation is made as to whether the already obtained updating operation information of the map data indicated by the map data identification information of the map management record taken out in step ST71 has been stored or not in the updated data storage device 16 based on the updating operation information management information of the updated data storage device 16. If the already obtained updating operation information is not present, then the process proceeds to step ST74. If present, the process proceeds to step ST75.

In step ST74, the already updated map data indicated by the map data identification information of the map management record taken out in step ST71 is obtained from the updated data storage device 16.

In step ST75, the already obtained updating operation information of the map data indicated by the map data identification information of the map management record taken out in step ST71 is obtained from the updated data storage device 16. The map data indicated by the map data identification information of the map management record taken out in step ST71 is taken out from the map data storage device 13. As in the case of step ST18, updating is executed for the map data based on the already obtained updating operation information, and then the process proceeds to step ST76.

In step ST76, the already updated map data obtained in step ST74, or the map data updated in step ST75 is stored in the map buffer of the map data processor 15. The map management information is updated as in the case of step ST62, and then the process proceeds to step ST71.

Thereafter, the procedure of step ST71 and the follower is executed for all the map management records of the map management information, and the processing of step ST20 is finished.

As described above, the updating operation information indicating that the processing time required for updating is longer than the predetermined time is stored as the already updated map data in the updating data storage device 16, and the already updated map data is taken out when necessary. Thus, time required for re-obtaining the updated map data becomes equal to/shorter than a predetermined time.

Embodiment 4

FIG. 31 is a flowchart showing the operation of a map data processing apparatus according to the fourth embodiment, where steps ST82 and ST82 are added to the process of FIG. 12. In step ST81, the updating operation information generator 24 generates necessary corresponding node information by referring to the updating operation information request obtained in step ST2. In step ST82, the corresponding node information generated in step ST81 is transmitted to the transmitter/receiver 14 by the transmitter/receiver 21.

The updating operation information request obtained in step ST2 contains the number of bits of adjacent information, and bits of adjacent information corresponding to the number. The adjacent information is composed of an adjacent number indicating each map data adjacent to map data indicated by the map data identification information in the updating operation information request, and its version.

As described below, when only the map data of a certain area is updated, mismatching occurs in node correspondence due to a version difference between the area and its adjacent area.

FIG. 32 shows a relation between the areas of the map data. A rectangular region 0 indicates an area of the map data of the map data ID M indicated by the map data identification information in the updating operation information request obtained in step ST2. Rectangular regions 1 to 8 indicate areas of adjacent map data. The map data of the adjoined area is referred to as adjacent map data. In addition, numbers shown in FIG. 31 are used to specify the adjoined areas and the adjacent map data, and each of these numbers is referred to as an adjacent number.

Figures 33A, 33B, 33C, 33D, 33E:
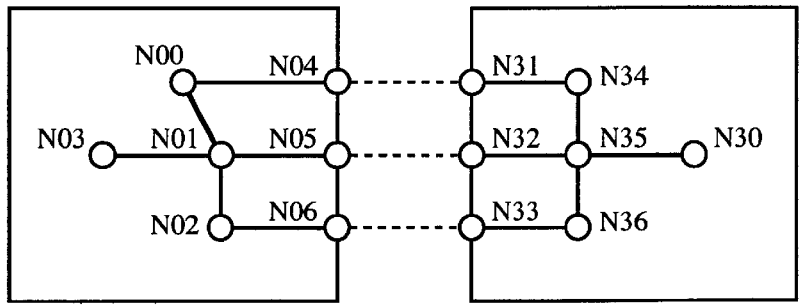
FIGS. 33A to 33E are views, each showing an example of a road net.

In FIGS. 33A to 33E, FIG. 33A shows the example of the road net of the map data of a version V of map data ID; and FIG. 33B shows the example of the road net of the map data of a version V and the map data ID Mb of an adjacent number 3 adjacent to the above map data.

FIG. 33C shows a relation between the node and the node record number of route calculation data in each of FIGS. 5A to 5J regarding the road net of FIG. 33A; and FIG. 33D shows the node record number of the node of the route calculation data in each of FIGS. 5A to 5J regarding the road net of FIG. 33B.

Nodes N04, N05 and N06, and nodes N31, N32, and N33 are located on the boundary of the areas of the respective map data. The nodes N04 and N31 are the same nodes; the nodes N05 and N32 the same nodes; and the nodes N06 and N33 the same nodes.

To represent a node relation between such adjacent map data, for example, the node N31 of the map data of the adjacent number 3 is represented as an adjacent node of the node N04. Accordingly, adjacent numbers are allocated to the linked records of FIG. 5H. When an adjacent number is 0, a node indicated by adjacent node information is a node of the map data. When an adjacent number is other than 0, a node indicated by adjacent node information is a node of the map data indicated by the adjacent number. As an example, the linked record of the node N04 is shown in FIG. 33E.

Figures 34A, 34B, 34C, 34D:
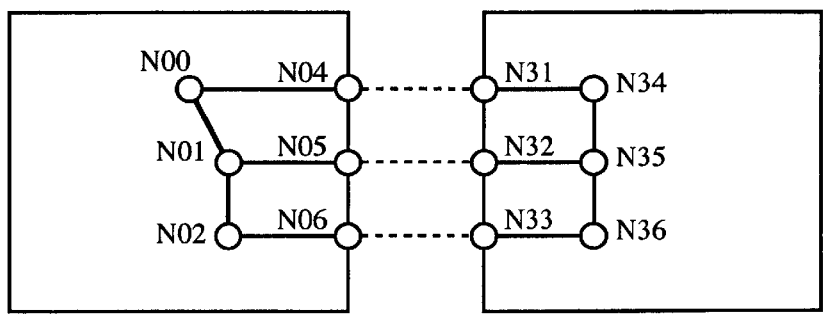
FIGS. 34A to 34D are views, each showing an example of a road net.

In FIGS. 34A to 34D, FIG. 34A shows a road net of a version VX, where the node N03 of the road net of FIG. 34A is deleted; FIG. 34B shows a road net of a version VX, where the node N30 of the road net of FIG. 33B is deleted; and FIGS. 34C and 34D show node record numbers of the nodes of the road nets of FIGS. 34A and 34B respectively, specifically showing that the node record numbers of the nodes N04, N05, and N06 have been changed to 3, 4, and 5 by deleting the node N03, and the node record numbers of nodes N31 to N36 have been changed to 0 to 5 by deleting a node N30.

Each of FIGS. 35A to 35F shows the state of only the road net of FIG. 33A having been updated to the version VX based on the updating operation information generated in step ST3 of FIG. 31. Specifically, FIG. 35A shows a road net identical to that of FIG. 34A; FIG. 35B shows a road net identical to that of FIG. 33B; FIGS. 35C and 35D node record numbers of the road nets of FIGS. 34A and 34B; and FIGS. 35E and 35F node record numbers of the nodes of the road nets of FIGS. 34A and 34B. For the adjacent node information of the linked record of the linked record number 1 of FIG. 35E, the node record number of the version V of FIG. 34D is used. For the adjacent node information of the linked record of the linked record number 1 of FIG. 35F, the node record number of the version V of FIG. 33C is used. Thus, in FIGS. 35E and 35F, a relation between the road nets of FIGS. 35A and 35B cannot be correctly represented. For example, in FIG. 35E, an adjacent node of the node N04 has a node record number 0, i.e., a node N30. In FIG. 35F, an adjacent node of the node N31 has a node record number 4, i.e., a node N05. Thus, mismatching occurs between the map data adjacent each other but different in versions.

In FIGS. 36A and 36B, FIG. 36A shows a correspondence between the node record numbers of the node versions VX and V in the area of FIG. 35A; and FIG. 36B shows a correspondence between the node record numbers of the node versions VX and V in the area of FIG. 35B. From the correspondence of each of FIGS. 36A and 36B, a node record number in a desired version can be known, and mismatching between the adjacent map data of different version like that described above can be prevented.

Figure 37A:
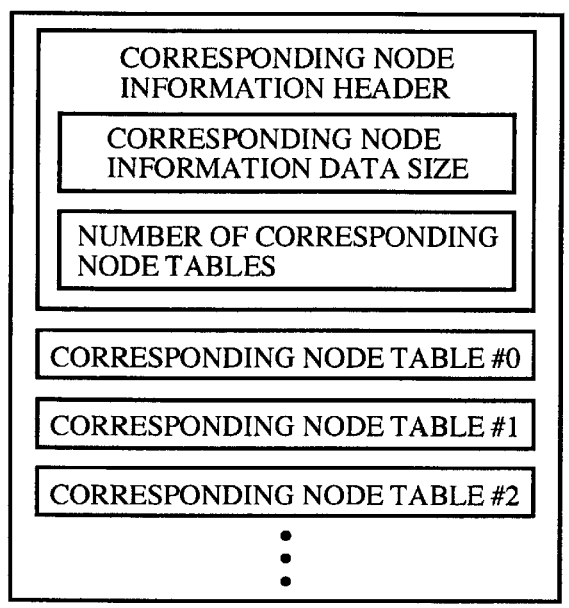
FIGS. 37A to 37C are views, each showing an example of a data structure of corresponding node information.
Figure 37B:
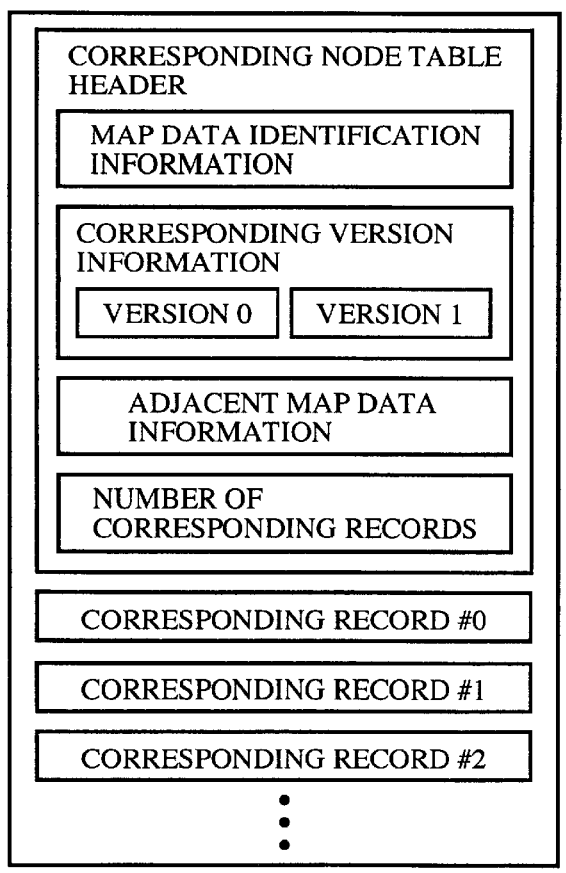
Figure 37C:
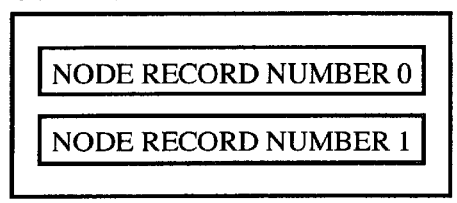

Each of FIGS. 37A to 37C shows the example of the data structure of corresponding node information generated in step ST81 of FIG. 31. As shown in FIG. 37A, the corresponding node information is composed of a corresponding node information header, and one or a plurality of corresponding node tables. The corresponding node information header includes a corresponding node information data size indicating the data size of corresponding node information, and a corresponding node table number indicating the number of corresponding node tables of the corresponding node information.

FIG. 37B shows the data structure of the corresponding node table, which is composed of a corresponding node table header, and one or a plurality of corresponding records. The corresponding node table header includes map data identification information indicating map data ID, corresponding version information having versions 0 and 1 and indicating a correspondence between the versions 0 and 1, adjacent map data information representing an adjacent number indicating map data adjacent to the map data indicated by the map data identification information, and a corresponding record number indicating the number of corresponding records of the corresponding node table. When the map data identification information indicates map data M, the corresponding node table is referred to as a corresponding table of the map data M.

FIG. 37C shows the data structure of the corresponding record. For the node in the map data indicated by the map data identification information, which is a node included in the map data indicated by the adjacent map data, the corresponding record has the node record number of the version 0 stored in the node record number 0, and the node record number of the version 1 stored in the node record number 1.

Each of FIGS. 38A and 38B shows the example of the corresponding node table of the data structure shown in each of FIGS. 37A to 37C. Specifically, FIG. 38A shows a corresponding table, where the adjacent map data information of the map data of FIG. 35A indicates the map data of FIG. 35B; and FIG. 38B shows a corresponding table, where the adjacent map data information of the map data of FIG. 35B indicates the map data of FIG. 35B.

Figure 39:
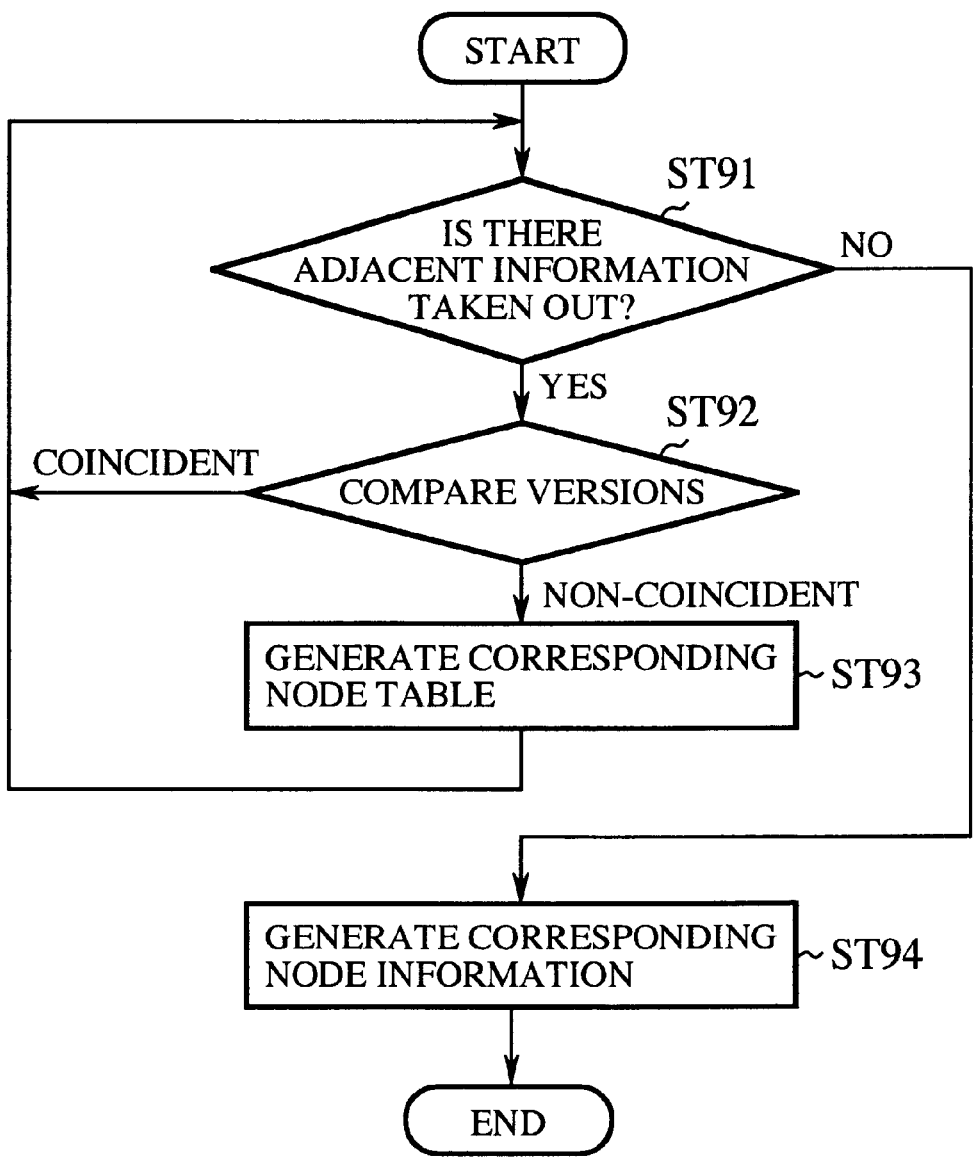
FIG. 39 is a detailed flowchart of step ST81 shown in FIG. 31.

FIG. 39 is a flowchart showing in detail the processing of step ST81 of FIG. 31.

In step ST91, an adjacent number Ai and a version Vi as bits of adjacent information in the updating operation information request obtained in step ST2 of FIG. 31 are taken out, and the process proceeds to step ST94.

In step ST92, a latest version VX and the version Vi obtained in step ST91 are compared with each other. If coincidence is determined, the process proceeds to step ST91. If non-coincidence is determined, the process proceeds to step ST93.

In step ST93, by referring to the road net database 22 and the road net update database 23, a correspondence is obtained between the node record numbers of the version VX of the map data indicated by map data identification information in the updating operation information request, and the node of the version Vi, and a corresponding node table shown in each of FIGS. 37A to 37C is generated. In addition, a correspondence is obtained between the node record numbers of the version VX of the map data adjacent to the map data indicated by the map data identification information in the updating operation information request, as the adjacent number Ai, and the node of the version Vi, and a corresponding node table shown in each of FIGS. 37A to 37C. Then, the process proceeds to step ST91.

Thereafter, for all bits of adjacent information in the updating operation information request, the process of steps ST91, ST92 and ST93 is carried out.

In step ST94, corresponding node information shown in each of FIGS. 37A to 37C is generated by using the generated corresponding node table, and then the processing of step ST81 is finished.

Figure 40:
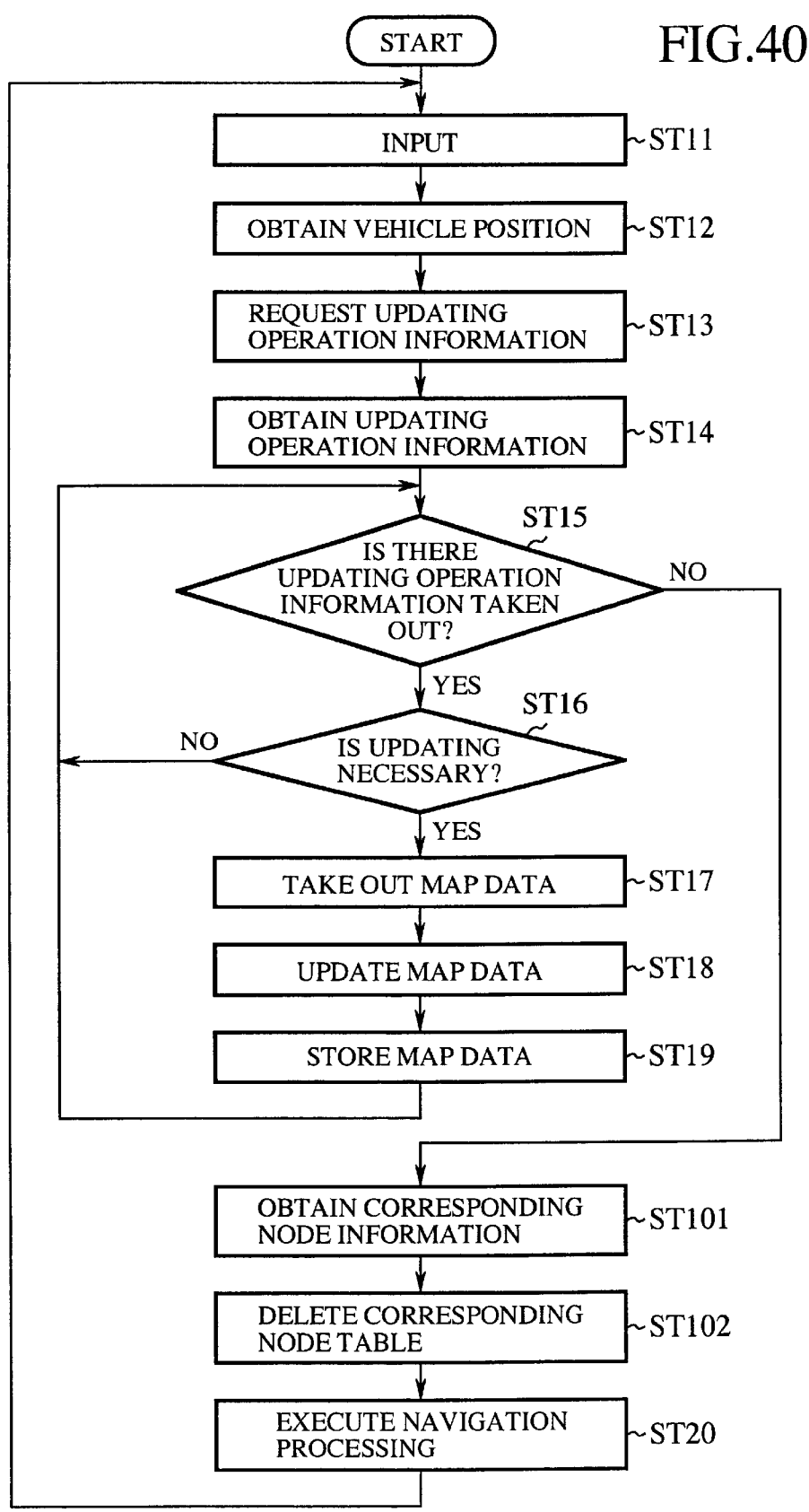
FIG. 40 is a flowchart showing an operation of a map data processing apparatus according to a fifth embodiment.

FIG. 40 is a flowchart showing the operation of a map data processing apparatus according to a fifth embodiment, where steps ST101 and ST102 are added to the process of FIG. 16. In step ST13, the number of adjacent information regarding the map data of an area adjacent to an area needing navigation processing, and adjacent information are added to the updating operation information request, and transmitted by the transmitter/receiver 14 to the map data providing station.

Figure 41:
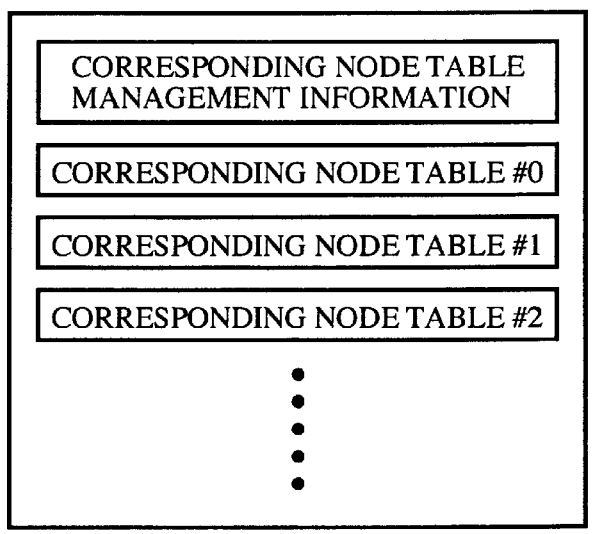
FIG. 41 is a view showing an example of a data structure of a node table storage section.
Figure 42:
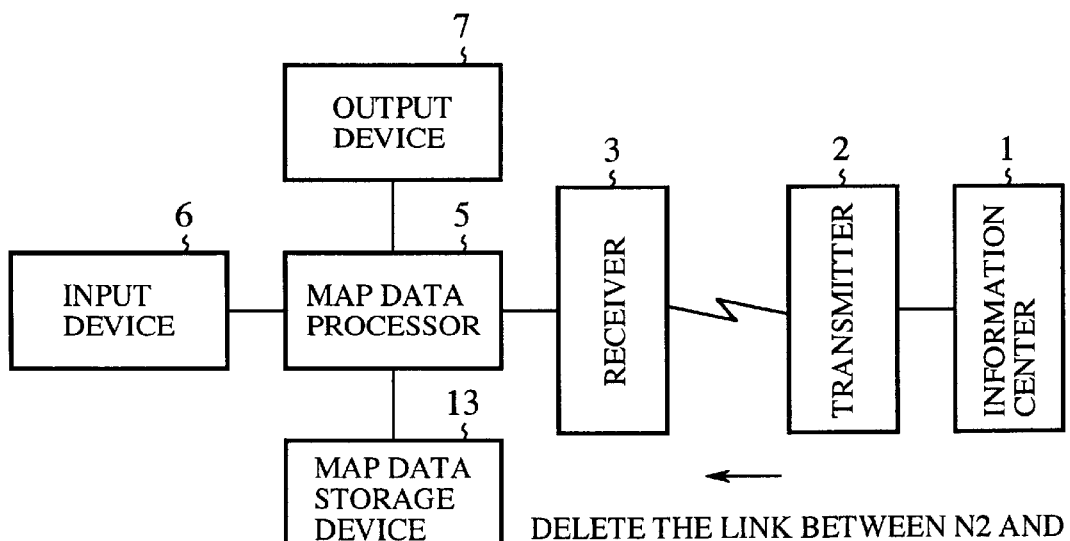
FIG. 42 is a constitutional view showing a conventional map data processing apparatus.

In step ST101, according to the updating operation information request of step ST13, corresponding node information sent from the map data providing station is received by the transmitter/receiver 14. Then, according to the corresponding node table management information of a corresponding node table storage section provided in the updated data storage device 16, shown in FIG. 41, a corresponding node table in the received corresponding node information is stored in the updated data storage device 16. The corresponding node table management information is for managing the location of each corresponding node table. When the storage capacity of the updated data storage device 16 is exceeded by storing the corresponding node table, the corresponding node tables stored in the updated data storage device 16 are deleted from that of the oldest storage time until a required vacant area can be secured, and the above-described corresponding table is stored.

In step ST102, the corresponding node tables of all the map data Ma, where the version of the map data stored in the map data storage device 13 indicated by the adjacent map data information of the corresponding node table of the map data Ma updated in steps ST15 to ST19 is coincident with the version of the map data Ma, are deleted from the updated data storage device 16. In addition, among the corresponding node tables where the adjacent map data information indicates the map data Ma, one where the version of the map data indicated by the map data identification information thereof is coincident with that of the map data Ma, is deleted from the updated data storage device 16.

By the foregoing process, the corresponding node table made unnecessary by updating both of the map data adjacent to each other to latest versions is deleted, and thus the storage area of the updated data storage device 16 is efficiently used.

In step ST20, when the adjacent map data My of a version Vy is referred to during referring to a certain map data Mx of a version Vx, if the version Mx and the version My are different from each other, then based on a corresponding node table showing a correspondence where the corresponding version information of the map data My stored in the map data storage device 13 is between the versions Mx and My, reference is made to the map data My by using a node record number obtained by converting the node record number of the version Mx to that of the version My.

For example, in FIGS. 35A to 35F and FIGS. 37A to 37C, with Mx=Ma, My=Mb, Vx=VX and Vy=V, when reference is made to the adjacent node of the node N06 of the node record number 5 of the map data Ma of the version VX, the node record number of the adjacent node is 2 in the map data Mb of the version VX from FIG. 35E. Thus, from the corresponding table (FIG. 38B) of the map data Mb, a corresponding record, where the node record number 0 is 2, i.e., a corresponding record #2, is found. Then, a node in ht map data Mb of the version V where a node record number indicated by the node record number 1 of the corresponding record #2 is 3, i.e., a node N33, is set as an adjacent node.

Thus, by using the corresponding node table, navigation processing matched over the map data of different versions is carried out.

In each of the foregoing first to fourth embodiments, the updating operation information and the corresponding node information are obtained from the transmitter/receiver 14. However, such information may be obtained from a removable storage medium such as a memory card.

In each of the first to fourth embodiments, the map data storage device 13 and the updated data storage device 16 are separately provided. However, these devices may be unified in one storage device, where when the updated map data is stored, the map data of an old version in the area of the map data may be deleted.

In each of the first to fourth embodiments, when the map data, the updating operation information and the corresponding node table are stored in the updated data storage device 16, if the storage capacity of the updated data storage device 16 is exceeded, the map data, the updating operation information and the corresponding node table stored in the updated data storage device 16 are deleted in the order of old storage time. However, deletion may be made in the order of low frequency of reference made in the past. Deletion may be made in the order of those outside an area estimated to be needed for next navigation processing, or most separated from this area. Deletion may be made by combining these conditions.

In each of the foregoing first to third embodiments, the example of route calculation data was shown. However, the embodiment may be applied to any data constituting map data.

In each of the first to third embodiments, the version is managed by a map data unit. However, a version may be independently managed for each data constituting the map data, and updating may be carried out for each data constituting the map data.

In each of the first to third embodiments, for updating of the offsets and the record numbers included in various data records, without obtaining these as updating operating information, calculation may be made from the map data and the updating operating information before updating, and then updating may be carried out.

In the foregoing third embodiment, in step ST63, the determination of the necessity of storage was made based on processing time expended for updating. However, the necessity of storage may be determined when the data size of the map data after updating is equal to/higher than a predetermined value. The necessity of storage may be determined when the data size of the vacant area of the updated data storage device 16 is equal to/lower than a predetermined value.

In addition, in the foregoing fourth embodiment, the example of route calculation data was shown. However, the embodiment may be applied to any data regarding the road net, the data constituting the map data.

Moreover, in the fourth embodiment, the example where the common area of the adjacent areas was a line was taken. However, the common area of the adjacent areas may be a plane.

As apparent from the foregoing, the present invention is advantageous in the following respects. The map data processing apparatus comprises: the information obtaining means for obtaining updating operation information indicating the updating content of the map data stored in the storing means; and the updating means for updating the map data stored in the storing means according to the updating operating information obtained by the information obtaining means. Thus, it is possible to quickly update the map data.

The information obtaining means obtains the updating operation information containing updating position information, where a part to be updated is represented by an offset from a predetermined reference position in the map data. Thus, it is possible to quickly understand the part to be updated.

The information obtaining means obtains updating operation information containing, among data included in the map data, data specifying information for specifying the data to be updated, and updating position information indicating a record storing the data. Thus, it is possible to quickly update the map data without complicating the constitution.

The information obtaining means obtains updating operation information containing updating position information indicating at least one or more updating positions in the record. Thus, it is possible to update partial data in the record.

The information obtaining means obtains updating operation information containing update type information indicating the update type of at least one or more parts to be updated in the record. Thus, it is possible to perform a plurality of updating operations of different types once in the same record.

The data storing means is provided for storing the updating operation information obtained by the information obtaining means when the updating time by the updating means exceeds the predetermined reference time, and storing the map data after updating by the updating means when the updating time is less than the predetermined reference time. Thus, it is possible to quickly perform re-obtaining processing of the updated map data.

The data storing means is provided for storing the updating operation information obtained by the information obtaining means when the estimated processing time of updating by the updating means exceeds the predetermined reference time, and storing the map data after updating by the updating means when the estimated processing time of the updating is less than the predetermined reference time. Thus, it is possible to quickly perform re-obtaining processing of the updated map data.

When the storing means stores the map data, where the version of a certain area is different from that of the other area, corresponding node information indicating a correspondence between identical nodes of respective versions is obtained. Thus, even when the map data has been stored, where the version of a certain area is different from that of the other area, it is possible to perform matched navigation processing.

The information obtaining means obtains corresponding node information only when the versions of the areas adjacent to each other are different, the corresponding node information obtained regarding identical nodes present in the areas adjacent to each other. Thus, it is possible to efficiently use the storage device.

The information obtaining means obtains, in the areas adjacent to each other, only the corresponding node information of the same node present in the overlapped part of both areas. Thus, it is possible to efficiently use the storage device.

The updating operation information indicating the updating content of the map data is obtained, and the map data is updated according to the updating operation information. Thus, it is possible to quickly update the map data.

The updating operation information containing the updating position information, where the place to be updated is represented by an offset from the predetermined reference position in the map data, is obtained. Thus, it is possible to quickly understand the part to be updated.

Among the data included in the map data, the data specifying information specifying the data to be updated, and the updating operation information containing the updating position information indicating the record having stored the data, are obtained. Thus, it is possible to quickly update the map data without complicating the constitution.

The updating operation information containing the updating position information indicating at least one or more updating positions in the record, is obtained. Thus, it is possible to update partial data in the record.

The updating operation information containing the update type information indicating the update types of at least one or more parts to be updated in the record, is obtained. Thus, it is possible to perform plurality of updating operations of different types once.

When the updating time of the map data exceeds the predetermined reference time, the obtained updating operation information is stored. When the updating time is less than the predetermined reference time, the map data after updating is stored. Thus, it is possible to quickly perform re-obtaining processing of the updated map data.

When the estimated updating time of the map data exceeds the predetermined reference time, the obtained updating operation information is stored. When the estimated updating time is less than the predetermined reference time, the map data after updating is stored. Thus, it is possible to quickly perform re-obtaining processing of the updated map data.

If there is map data stored, where the version of a certain area is different from that of the other area, the corresponding node information indicating a correspondence between identical nodes of the respective versions is obtained. Thus, even if the map data has been stored, where the version of a certain area is different from that of the other area, it is possible to execute matched navigation processing.

The corresponding node information is obtained only when the versions of the areas adjacent to each other are different, the corresponding node information obtained regarding the identical nodes present in the areas adjacent to each other. Thus, it is possible to efficiently use the storage device.

Only the corresponding node information of the same node present in the overlapped part of the areas adjacent to each other is obtained. Thus, it is possible to efficiently use the storage device.

What is claimed is:

1. A map data processing apparatus comprising:
    storing means for storing map data, the map data including record map data stored in a plurality of tables, and header map data indicating a location of each table by an offset from a reference point;
    information acquiring means for sending an updating operation request requesting an update in the map data to a map-data-providing station, and for acquiring updating-operation information indicating updating content transmitted from the map-data-providing station in response to the updating-operation request containing map data identification information and a version number for the map data identification information; and
    updating means for updating the map data stored in said storing means according to the updating-operation information acquired by said information acquiring means, wherein the updating-operation information contains an updating information header that includes data type information for specifying type of the map data to be updated,
    update position information for specifying whether the map data to be updated is located by a record number or offset information, and
    update type information indicating type of update to be performed on the map data.

2. The map data processing apparatus according to claim 1, wherein the updating-operation information specifies a part to be updated as having a position represented by an offset from a reference position in the data structure of the map data.

3. The map data processing apparatus according to claim 1, wherein the updating-operation information indicates at least one updating position in a record.

4. The map data processing apparatus according to claim 1, wherein the updating-operation information specifies a part to be updated as having a position represented by a record number.

5. The map data processing apparatus according to claim 1, wherein the updating-operation request contains map data identification information indicating the map data.

6. The map data processing apparatus according to claim 1, wherein the updating-operation request contains adjacent information indicating adjacent areas, wherein the adjacent information includes an adjacent number indicating map data adjacent to map data indicated by the map data identification information in the updating-operation information request.

7. The map data processing apparatus according to claim 1, wherein the updating-operation information is updated by updating operation information-management information indicating that the updating-operation information is stored as previously acquired updating-operation information when updating time of the map data exceeds a predetermined time, wherein the updating-operation-information-management information contains map management records, each of which includes
    map data identification indicating a map data identifier (ID) of corresponding map data,
    map data presence information indicating presence of the corresponding map data, and
    map data position information indicating a location of the corresponding map data.

8. A map data processing method comprising:
    acquiring updating-operation information transmitted from a map-data-providing station in response to an updating-operation request, requesting an update of the map data, wherein the updating-operation information contains an updating information header that includes data type information for specifying type of map data to be updated,
    update position information for specifying whether the map data to be updated is located by a record number or offset information, and
    update type information indicating type of update to be performed on the map data; and
    updating the map data according to the updating-operation information.

9. A map-data-providing station comprising:
    a road-link database for storing road-link data managed by a version unit;

a road-link-updating database for storing road-link-updating data indicating an updating state of respective versions; and updating-operation information generating means for generating updating-operation information of the road-link data of respective versions with reference to the road-link data and the road-link-updating data in accordance with updating-operation information indicating updating content of map data acquired from a map-data processing device, wherein the updating-operation information contains an updating information header that includes data type information for specifying type of map data to be updated, update position information for specifying whether map data to be updated is located by a record number or offset information, and update type information indicating type of update to be performed on the map data.

10. A map-data-providing method comprising:

generating updating-operation information for road-link data of respective versions with reference to road-link information managed by a version unit, wherein the updating-operation information generated indicates updating state of respective versions in accordance with updating-operation information indicating an updating content of map data acquired from a map data processing apparatus, wherein the updating-operation information contains an updating information header that includes data type information for specifying type of map data to be updated, update position information for specifying whether map data to be updated is located by a record number or offset information, and update type information indicating type of update to be performed on the map data; and transmitting the updating-operation information generated to a map data processing apparatus.

* * * * *